(12) United States Patent
Huang et al.

(10) Patent No.: US 6,301,244 B1
(45) Date of Patent: Oct. 9, 2001

(54) QOS-ORIENTED ONE-TO-ALL ROUTE SELECTION METHOD FOR COMMUNICATION NETWORKS

(75) Inventors: Kaiyuan Huang; Gang Luo, both of Kanata; Jianli Wang, Ottawa, all of (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/208,980

(22) Filed: Dec. 11, 1998

(51) Int. Cl.[7] .................................................. H04L 12/28
(52) U.S. Cl. ............................................ 370/351; 370/238
(58) Field of Search .................................... 370/351, 352, 370/355, 356, 395, 229, 230, 231, 235, 238, 252, 254, 255, 256, 401, 406, 407, 408; 709/232, 238, 241

(56) References Cited

U.S. PATENT DOCUMENTS 5,754,543 * 5/1998 Seid ....................................... 370/351
5,933,425 * 8/1999 Iwata ..................................... 370/351
6,088,333 * 7/2000 Yang et al. ............................ 370/238

* cited by examiner

*Primary Examiner*—Alpus H. Hsu
*Assistant Examiner*—Brian Nguyen
(74) *Attorney, Agent, or Firm*—Allan P. Millard

(57) ABSTRACT

A method is described for one-to-all route selection in Communications Networks with multiple QoS metrics. This method takes a first metric (say, delay) as a constraint and a second metric (say, cost) as an optimization target. A potential objective is to find a path between a source node and each node in a communications network such that the delay of the path does not exceed a path delay constraint and the cost of the path is minimized. The method selects a first path which is a shortest path from a source node to each node in terms of the first metric using Dijkstra's algorithm. A reachability graph is then constructed based on the first metric path constraint. Within the reachability graph, another path is found, which is a shortest path from a source node to each node in terms of the second metric, using Dijkstra's algorithm. Any path to a particular node selected within the reachability graph replaces the first path to said particular node. This method can guarantee to find a nearly optimal path with the given constraint satisfied as long as there exists such a path.

8 Claims, 20 Drawing Sheets

QOS-ORIENTED ONE-TO-ALL ROUTE SELECTION METHOD FOR COMMUNICATION NETWORKS

FIELD OF THE INVENTION

The present invention relates to communication networks and is particularly concerned with QoS-oriented route selection.

BACKGROUND OF THE INVENTION

In traditional data communication networks, routing is primarily concerned with connectivity. To achieve efficient utilization of network resources, the cheapest routes are usually selected by finding the shortest paths using algorithms such as Dijkstra's.

Dijkstra's algorithm, which was developed by Edsger Dijkstra in 1959, is a well known method described in, for example, C. Papadimitriou, K. Steiglitz, (1982), *Combinatorial Optimization: Algorithms and Complexity*, Prentice-Hall, the contents of which are incorporated herein by reference. Dijkstra's algorithm takes a graph with weighted links and a given root vertex as its input and returns, as its output, a label for each vertex on the graph. In the case where the weights represent the length of the links, each vertex label represents the length of the shortest path from the root vertex to the particular vertex. Thus the algorithm allows finding the shortest path for travelling from a given vertex on a graph to every other vertex.

With the arrival of multimedia applications such as video and audio, it is realized that connectivity alone is far from adequate for such applications to be successful. Unlike traditional data communication applications such as e-mail and remote file transfers, live video and audio cannot tolerate excessive delay and need guaranteed maximum delay and bandwidth. To deliver such Quality of Service (QoS) guarantees, a network must make resource reservations and exercise network control. In "Private Network-Network Interface Specification Version 1.0 (PNNI 1.0)," ATM Forum, 1996, resource reservation has been incorporated in the PNNI protocol for Asynchronous Transfer Mode (ATM) communication. As well, "RSVP" has been developed as a resource reservation protocol for the Internet. Multiple QoS metrics such as cost, delay, delay variation, loss probability and bandwidth are accommodated by the PNNI protocol. As a result, the routing problem, that of achieving efficient utilization of network resources, is further complicated by these QoS metrics. The route selection problem is now to find a path from the source to the destination that satisfies all QoS constraints and has the lowest cost.

The most studied QoS metrics fall into two categories. The first category is concave, in which the aggregate metric over a path is the minimum of the values of this metric for all sections of the path. The second category is additive, in which the aggregate metric over a path is the sum of the values of this metric for all sections of the path.

Zheng Wang and Jon Crowcroft, "Quality of Service Routing for Supporting Multimedia Applications," (1996), *IEEE Jour. Sel. Area. Comm.*, Vol. 14, No. 17, pp. 1228–1234, and R. Guerin et al., "QoS Routing Mechanism and OSPF Extensions," Internet Draft, Mar. 25, 1997, demonstrated that concave metrics can be easily handled by simply ignoring those links between nodes that do not satisfy the constraints since a decision can be made locally at a link. For example, all links that do not satisfy the bandwidth constraints can be removed before selecting a route.

Selecting a route is not simple, however, for additive metrics. This is because a decision cannot be made until the value of the metric for each link on a path has been examined. For example, to determine if a path satisfies a given delay constraint it is necessary to compare the sum of the delays of all links on the path to the constraint. Finding an algorithm that can handle two or more additive parameters has been challenging. No efficient, that is to say "polynomial-time", algorithms have been found so far to solve the problem completely, even if not considering any other QoS metrics. Worst of all, it is unlikely that any polynomial-time algorithm can ever be found. The intrinsic difficulty lies in that this problem is in the category of NP-HARD problems. An NP-HARD problem is defined as a problem with n variables for which the computation time is higher than $a^n$, for some a>1. This problem was identified as NP-HARD in J. M. Jaffe, "Algorithms for Finding Paths with Multiple Constraints," (1984), *Networks*, Vol. 14, pp. 95–116. For practical purposes, no polynomial time algorithms can be found for any NP-HARD problems.

A few heuristic approaches have been attempted to solve the QoS-oriented route selection problem. A common heuristic algorithm used by several ATM vendors uses Dijkstra's algorithm to find a minimum cost route and check the validity of this route against other constraints. (See, for example, Atshushi Iwata, et al., "PNNI Routing Algorithms for Multimedia ATM Internet," (1997), *NEC Res. and Develop.*, Vol. 38, No. 1; Data Connection, (1997), *DC-PNNI Specification*.) In the case of failure to find a route, the Dijkstra algorithm is used to find a shortest path route in terms of another additive metric, say delay, and then the validity of this route is checked against other metrics. The problem with this approach is that the algorithm gives up looking for minimum cost routes too easily and is likely to miss existing routes that satisfy all constraints and have minimum cost.

U.S. Pat. No. 5,467,343 issued Nov. 14, of 1995 to Lee proposes to combine all additive metrics into one and then solve the problem in polynomial time. (See also W. C. Lee, et al., "Rule based Call-by-Call Source Routing for Integrated Communication Networks", Infocom '93, pp.987–993, 1993 and W. C. Lee, et al., "Multi-Criteria Routing Subject to Resource and Performance Constraints," ATM Forum, 94-0280, March 1994.) Unfortunately, a function can not generally be formulated for this conversion. This is especially so where the metrics are independent. Consider, for example, delay and cost. At first glance, the delay and cost might be considered related and proportional. However, a carrier may want to consider any route going through a third party's network to be more expensive than his own. Thus, in general, these metrics must be considered to be independent.

SUMMARY OF THE INVENTION

In accordance with an aspect of the present invention there is provided a method for selecting paths from a source node to other nodes in a communications network having a primary link metric to be limited to a primary link metric path constraint and a secondary link metric to be optimized. Each metric is additive. The method includes constructing a reachability graph, the reachability graph including (i) links and (ii) nodes which terminate the links, for which a sum of the primary link metrics along every path in the reachability graph starting at the source node and passing through the link is no greater than the primary link metric path constraint and selecting a path from the source node to each node in the reachability graph, using only the links in the reachability graph, corresponding to a path wherein the secondary link metric is minimized.

In accordance with another aspect of the present invention there is provided a method for selecting paths from a source node to other nodes in a communications network having a primary link metric to be limited to a primary link metric path constraint and a secondary link metric to be optimized. Each the metric is additive. The method includes adding to a reachability graph from the source node any link from a node in the reachability graph to a first node where the link is associated with a primary link metric which, when summed with a primary link metric assigned to the node in the reachability graph from which the link extends, is less than the primary link metric path constraint. The method also includes, if at least one link to the first node is added to the reachability graph, adding the first node to the reachability graph and assigning, as a primary link metric for the first node, a maximum sum utilizing only links in the reachability graph, selecting paths from the source node through the reachability graph links to nodes in the reachability graph which optimize the secondary link metric. In accordance with other aspects of the present invention there is provided a computer readable medium for providing program control for a processor to carry out this method, a communications system including a controller with means for carrying out this method and a router including means for carrying out this method.

In accordance with a further aspect of the present invention there is provided, in a communication system including nodes and links between the nodes, a method for selecting a route from a source node to a plurality of nodes in the system. The method is based on two quality of service link metrics, a primary link metric to be limited to a primary link metric path constraint and a secondary link metric to be optimized. Each of the metrics is additive. The method includes selecting a first route from the source node to each node corresponding to a path wherein the primary link metric is minimized, eliminating from consideration those nodes for which a sum of the primary link metrics along the path wherein the primary link metric is minimized is greater than the primary link metric path constraint, the eliminating resulting in a plurality of nodes still under consideration. The method also includes constructing a reachability graph, the reachability graph including (i) links and (ii) nodes which terminate the links, for which a sum of the primary link metrics along every path in the reachability graph starting at the source node and passing through the link is no greater than the primary link metric path constraint. The method further includes determining a second route from the source node to each node in the reachability graph, using only the links in the reachability graph, corresponding to a path wherein the secondary link metric is minimized and replacing each selected first route to each node still under consideration with the second route if the second route differs from the first route.

BRIEF DESCRIPTION OF THE DRAWINGS

In the figures which illustrate an example embodiment of this invention.

DETAILED DESCRIPTION OF THE PREFERRED EMBODIMENTS

A communication network may be modelled by a connection graph $G(N,L,d(L),c(L))$, where: N is a set of nodes in the network; L is a set of links connecting the set of nodes in the network; $d(L)$ is a mapping from L to positive reals; and $c(L)$ is a mapping from L to positive reals. The link $(u,v)$ is in L if and only if u and v are nodes in the network and there exists a physical link from u to v.

The mapping $d((u,v))$ may be termed the primary link metric while the mapping $c((u,v))$ is termed the secondary link metric. By way of example, the primary link metric, $d((u,v))$, may be the delay of the link $(u,v)$ and the secondary link metric $c((u,v))$ the cost of the link $(u,v)$. The objective is to find a path between a source node, s, and each node in graph G such that the delay of the path (which is the sum of link delays over the path) does not exceed a path delay constraint D and the cost of the path (which is the sum of link costs over the path) is minimized.

Figure 1:
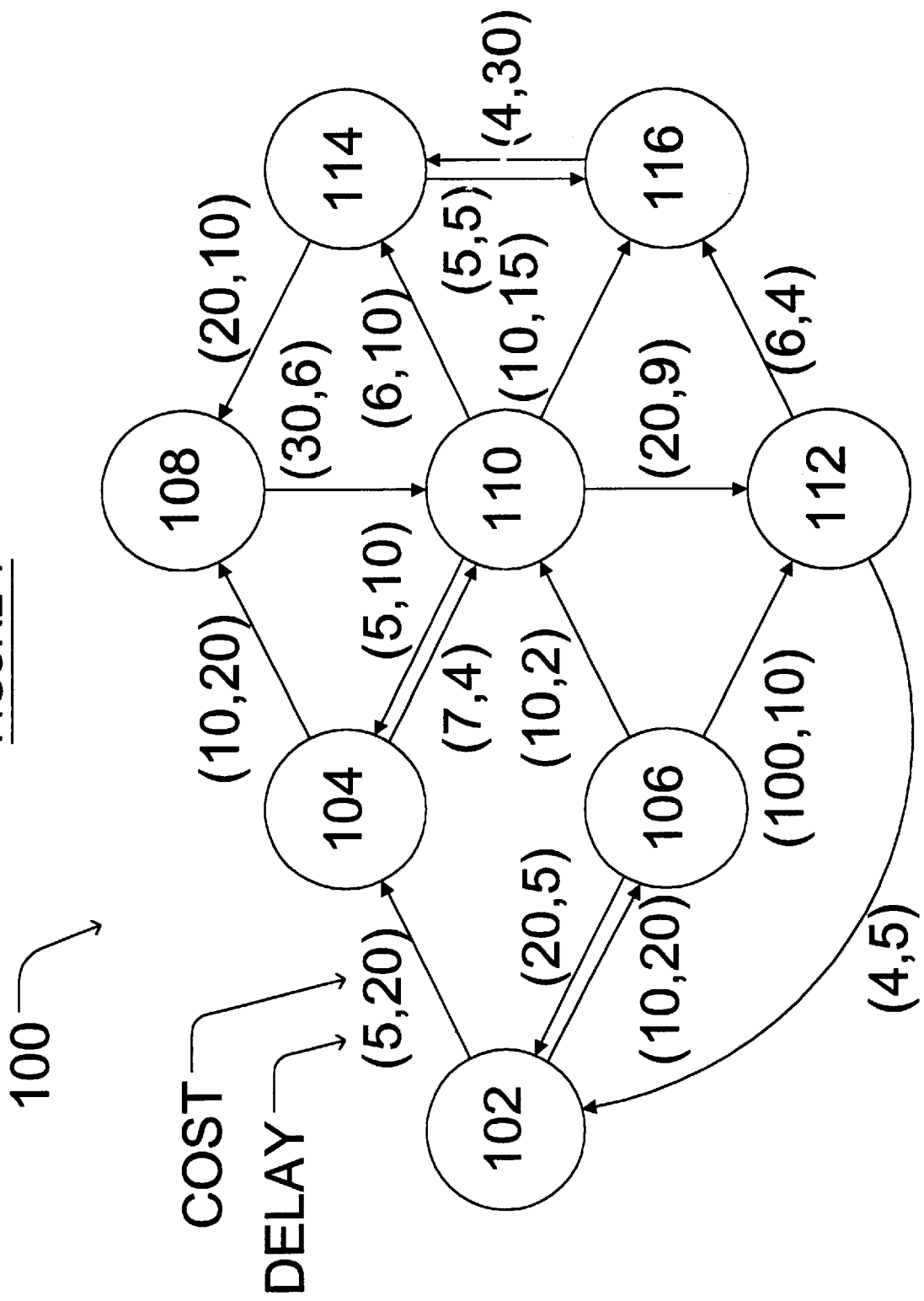
FIG. 1 is a schematic network of nodes representing a communications network.

Referring to FIG. 1, which models a communication system as a graph of nodes 100, the link $(u,v)$ between each pair of nodes is shown to have an associated delay and cost.

Figure 2:
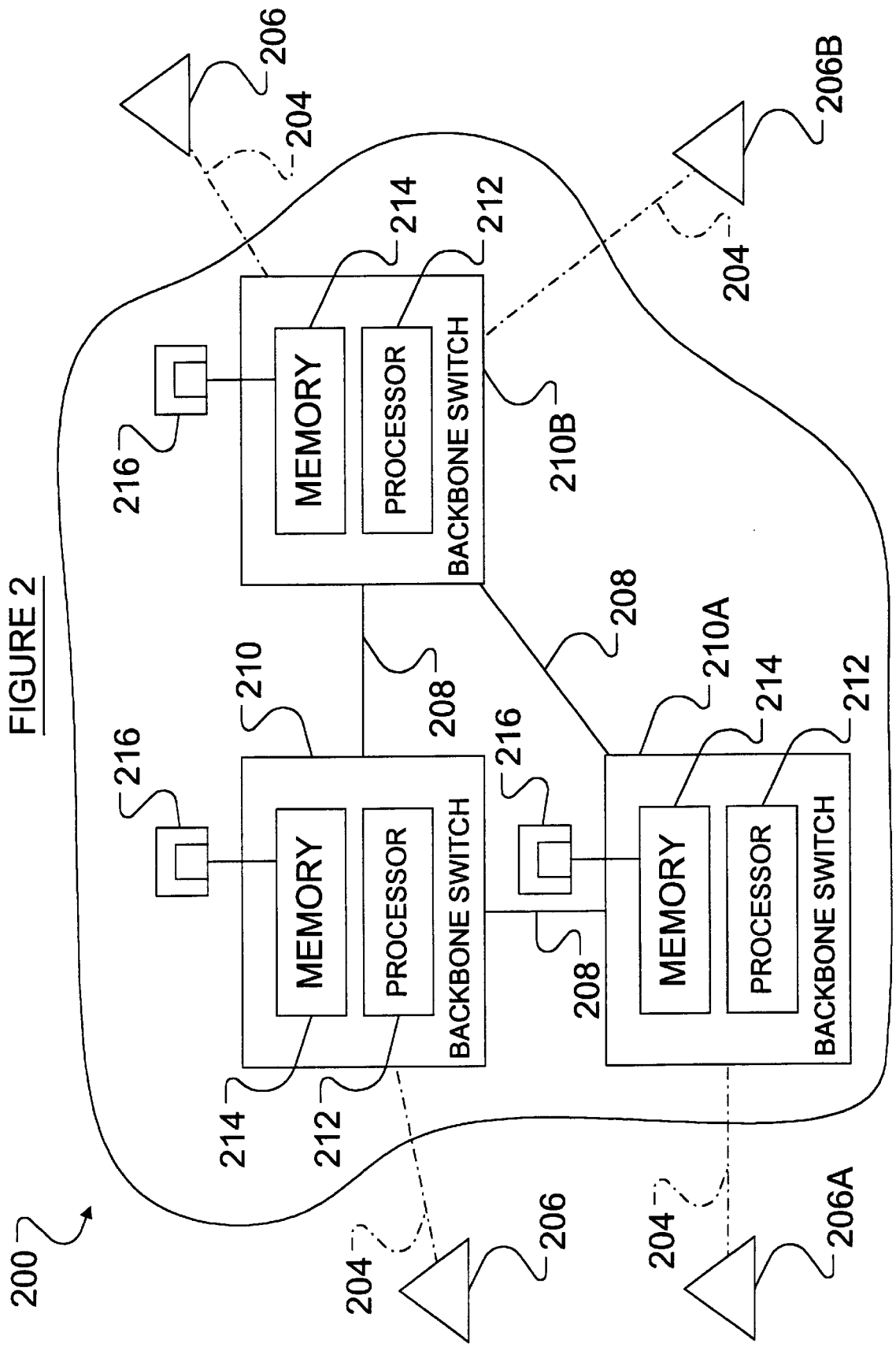
FIG. 2 schematically illustrates an ATM PNNI network suitable for use with this invention.

FIG. 2 illustrates an ATM PNNI network suitable for use with this invention. PNNI network 200 comprises a number of ATM backbone switch nodes 210 which are nodes interconnected by PNNI links 208. A number of ATM devices (work stations, servers or private ATM switches) 206 are connected to the backbone switch nodes 210 by UNI (User-to-Network Interface) 204 links. The backbone switch comprises a processor 212 and a memory 214 loaded with route selection software for executing the method of this invention from software medium 216 which could be a disk, a tape, a chip or a random access memory containing a file downloaded from a remote source.

In operation, if a backbone switch 210A receives a destination ATM address from an ATM device 206A indicating a request to connect to ATM device 206B, the switch, under control of software in memory 214, undertakes the method of this invention to determine an appropriate path to device 206B. In a conventional manner, the call is then set up over this path.

Figure 3:
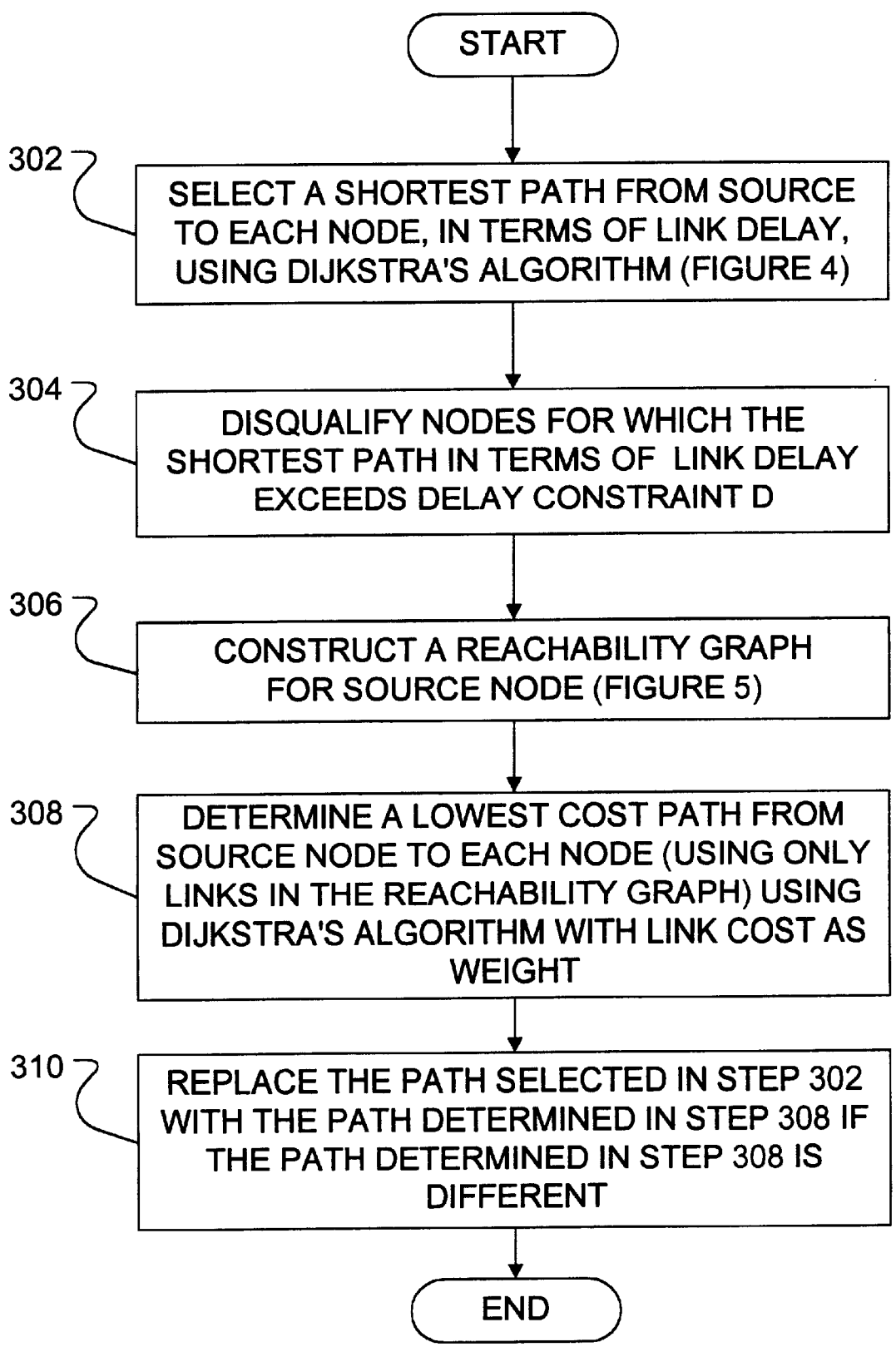
FIG. 3 is a flow diagram illustrating the steps of an algorithm in accordance with an embodiment of the invention.

In overview, with reference to FIG. 3, a one-to-all route selection algorithm in accordance with an embodiment of this invention begins with selecting a shortest path from a source s to each node in terms of delay (step 302). This step may be accomplished using Dijkstra's Algorithm, where the weight of each link is representative of delay. Those nodes for which the delay of the associated shortest delay path exceeds the path delay constraint D are disqualified from further consideration (step 304). A "reachability graph" is constructed for source node s (step 306). The path to each node with minimum cost is determined using Dijkstra's Algorithm, using only links in the reachability graph, where the weight of each link is representative of cost (step 308). Due to the criteria used to qualify links for addition to the reachability graph, the path determined in step 308 to a particular node may have a path delay which is not minimum, but is acceptable with regard to the path delay constraint D. For each node, the path determined in step 308 is selected if it differs from the path selected in step 302 (step 310).

Figure 4:
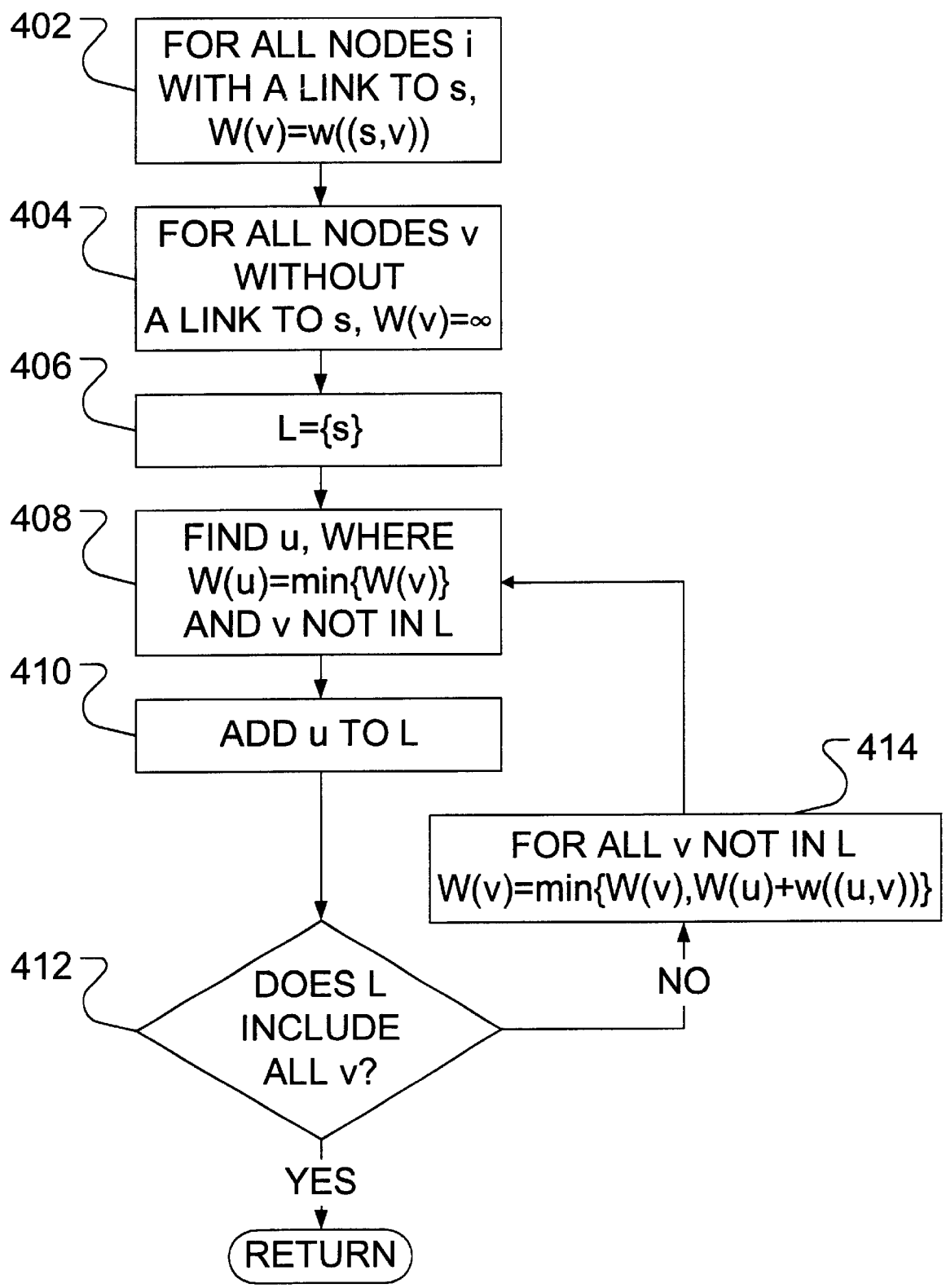
FIG. 4 is a flow diagram illustrating the steps of Dijkstra's algorithm.

The steps involved in Dijkstra's Algorithm are outlined in FIG. 4. It is assumed for purposes of illustration that w((u,v)) represents the weight of the link (u,v), where weight is a generic term which may represent an additive metric such as delay or cost. A constraint W(v) is associated with every node v (step 402). W(v) is initially set to w((s,v)), the weight of the link from node s to v or to where a link does not exist between s and v (step 404).

A set L is initialized with one element, that being the source node, s (step 406) and Dijkstra's Algorithm proceeds as follows. A node, u, is chosen from the nodes, v, that are not already in set L such that the weight associated with node u, W(u), is the minimum of all W(v)'s (step 408). The node u is then added to set L (step 410). If set L contains all nodes, Dijkstra's Algorithm is finished (step 412). If some nodes are not in L, the W(v)'s of such nodes are reevaluated as follows. For each node v not in set L, a new weight W(v) is assigned which is the lesser of either the current weight W(v) or the sum of the weight associated with the most recently added node W(u) and the weight w((u,v)) of the link from u to v (step 414). When the new W(v)'s have been assigned, the process returns to step 408 to select another node to add to set L. After the termination of Dijkstra's Algorithm, the resulting updated weights, W(v), associated with each node represent the weight of the minimum weight path from the source node s to each node v. That is, a path from the source node s to each node v exists with that minimum weight.

To begin the discussion of a "reachability graph," some terminology is introduced. A "neighbor set" of node u, $\vec{N}(u)$, may be defined as the set of nodes to which there are links coming from node u. Similarly, the neighbor set of a subset N' of N, $\vec{N}(N')$, is the set of nodes to which there are links coming from nodes in N' but which are not members of N' themselves.

With the connection graph denoted as G(N,L,d(L),c(L)), a "reachability" graph may be denoted as G'(N',L',d(L'),c(L'),s,D) starting from a source node s. The reachability graph is a subgraph of the corresponding connection graph. A link (u,v) is eligible to be in the reachability graph only if there is one path starting at the source node, passing through this link and terminating at v that satisfies a path delay constraint D.

A reachability graph is constructed by initiating a sub set of nodes, $N_0'$, with only the source node s. The source node delay constraint d(s) is set to 0. In stage 1, each node, v, with a link from s is then evaluated for addition to the reachability graph. Node v is deemed reachable and selected if and only if $d(s)+d((s,v)) \leq D$. After all candidate nodes have been evaluated, $N_1'$ results which includes all selected nodes v along with the source node s. The delay constraint d(v) of a given selected node is set to d(s)+d((s,v)). In stage 2, each node, v, in the neighbour set $\vec{N}(N_1')$ to $N_1'$ is evaluated and selected if there is a link to v from a node u in $N_1'$ such that $d(u)+d((u,v)) \leq D$. For $N_1'$, it is possible that there is more than one node u with a link to a given v. In such case, the maximum of the various calculated values for d(v) is chosen as d(v) for node v: this is known as the "max link qualification rule". After all candidates have been evaluated, $N_2'$ results. For stage 3, the same procedure is repeated. This continues until all nodes in graph G have been evaluated; the nodes selected at each stage are included in the reachability graph. In addition, every link to a given node in the reachability graph is itself included in the reachability graph if, for any such link, there is a path through such link to the given node which does not exceed D. Thus, there may be more than one path to a given node in the reachability graph.

More generally, the procedure in constructing the reachability graph may be described as follows. At each step of the construction of the reachability graph from the connection graph, nodes in the neighbor set—$\vec{N}(N')$—of the set of nodes—N'—that have already been reached are considered. Each node u in N' has a delay constraint d(u) associated with it with respect to paths reaching node u from source node s. A node v in $\vec{N}(N')$ is deemed reachable and selected for inclusion in the reachability graph if and only if there is at least one node u in N' such that $d(u)+d((u, v)) \leq D$. For a given node v in $\vec{N}(N')$ and u in N', link (u,v) is selected for inclusion in the reachability graph as long as $d(u)+d((u,v)) \leq D$. The delay constraint d(v) is assigned as the maximum of d(u)+d((u,v)) (the "max link qualification rule"). Note that all links in the reachability graph are in the forward direction from one neighbor set to the next neighbor set (i.e., progressively farther from the source node s, from u to v; links from v to u are ignored).

An exemplary procedure for constructing a reachability graph is next presented in conjunction with FIGS. 5 to 8.

Figure 5:
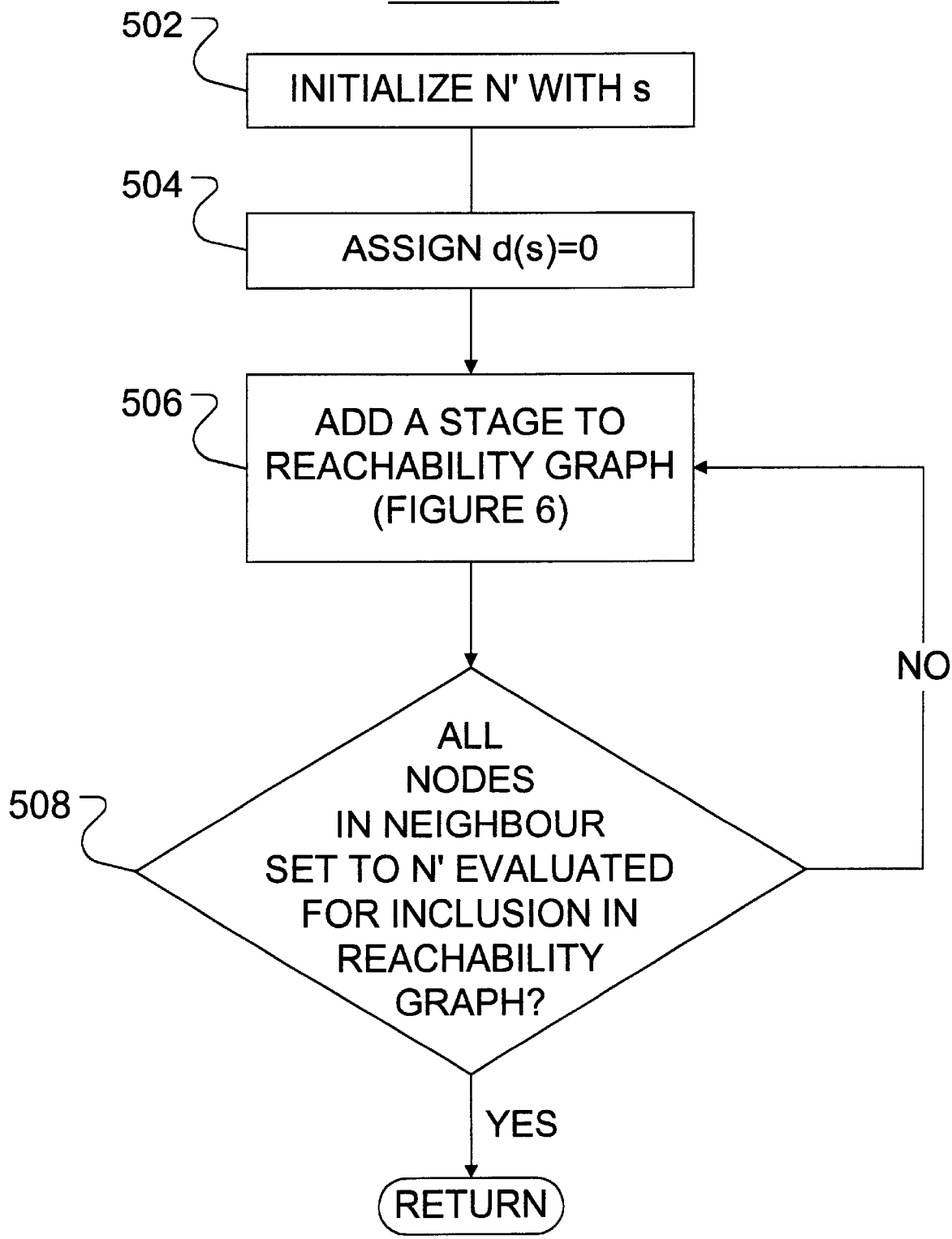
FIG. 5 illustrates, in a flow diagram, the steps of a reachability graph constructing algorithm of the process of FIG. 3.

Referencing FIG. 5, the set of nodes in the reachability graph, N', is initialized with the start node s (step 502). The value of d(s) is set to zero (step 504). A stage (i.e., nodes from the neighbour set of nodes $\vec{N}(N')$) is added to the reachability graph (step 506) using a procedure described hereafter in conjunction with FIG. 6 and stages are added until all nodes have been evaluated for inclusion in the reachability graph (step 508). A reachability graph can be constructed by recursively calling step 506 on the current node set N' and using the max link qualification rule.

Referencing FIG. 6, the steps in adding a stage to a reachability graph are as follows. Given an unfinished construction of reachability graph G' (covering a subset of nodes N'), the procedure continues the construction of the reachability graph considering the neighbor set of subset N'. A node u is selected from N' which has an outgoing link to $\vec{N}$(N') (step 602). For each node v, for which there exists a link (u,v), a judgement is made, using criteria described in conjunction with FIG. 7, regarding the addition of v to N' (step 604). If some nodes u in N' have not yet been considered, the process reverts to step 602 (step 606). If no nodes v were marked for addition to N' in step 604, the procedure for the current stage is complete (step 608). Those nodes v marked for addition to N' in step 604 are added to N' (step 610). The delay constraints, d(v), associated with nodes v marked for addition to N' in step 604, are assigned the value of a corresponding alternate delay constraint d"(v) (step 612). The valuation of d"(v) is described hereafter in conjunction with FIGS. 7 and 8.

Figure 6:
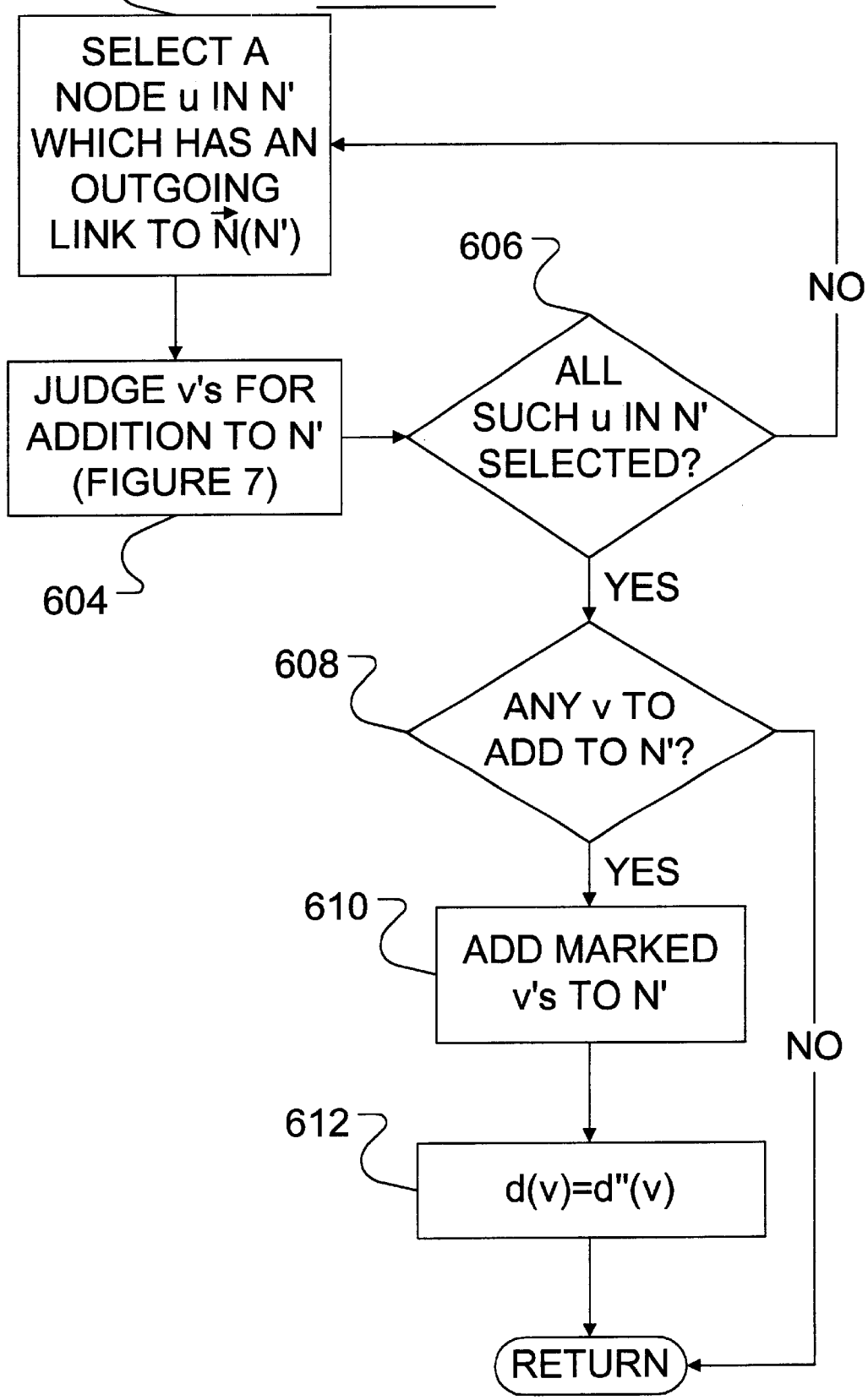
FIG. 6 illustrates, in a flow diagram, the steps of a reachability graph stage adding procedure of the algorithm of FIG. 5.
Figure 7:
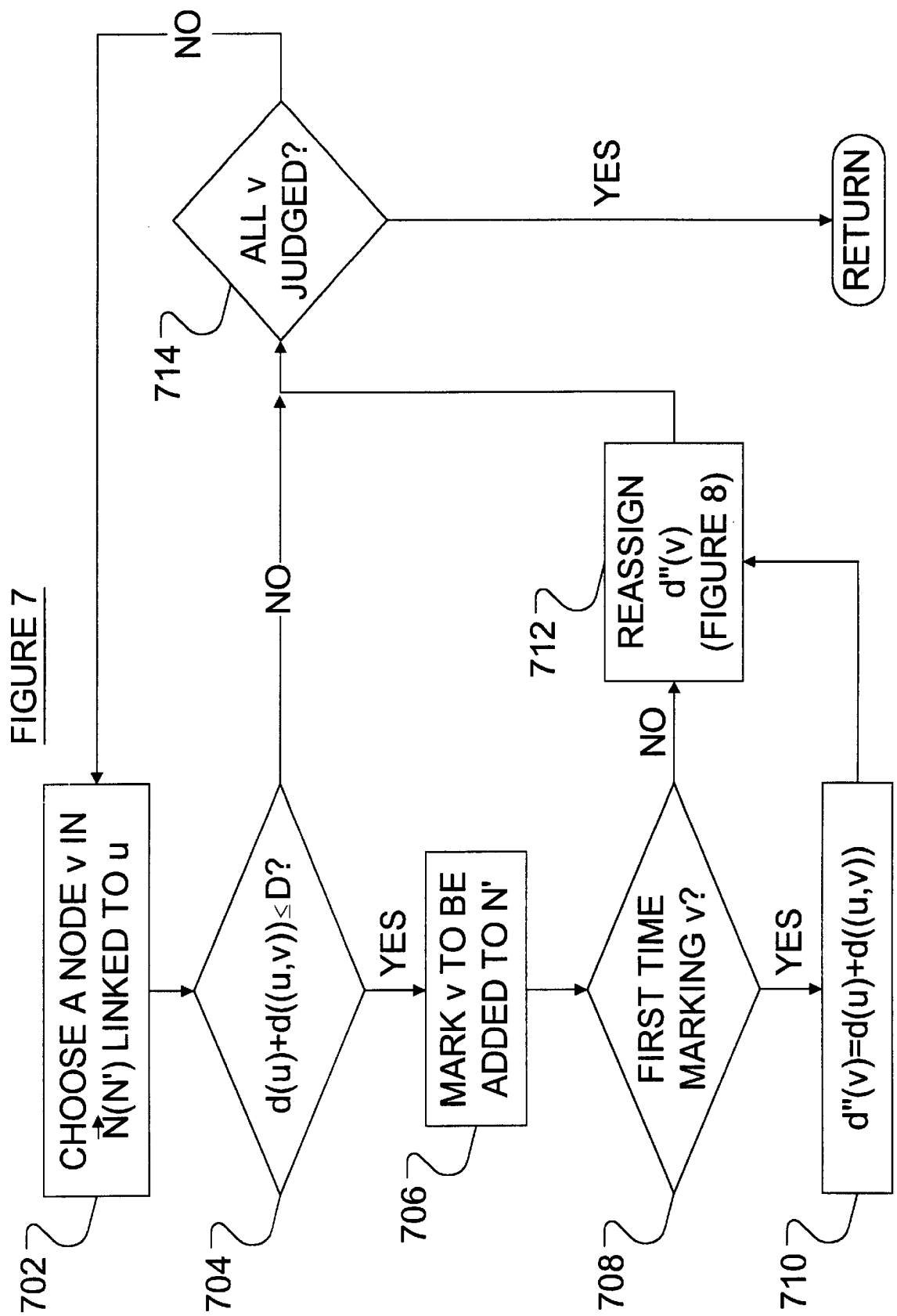
FIG. 7 illustrates, in a flow diagram, the steps of a node judging process of the procedure of FIG. 6.

Turning to FIG. 7 which illustrates the process for the application of criteria relating to making a determination regarding the addition of v to N' in step 604, a node v is selected from $\vec{N}$(N'), the neighbor set to the set of nodes in the unfinished reachability graph (step 702). The sum of d(u) (the delay of the path from the source s to node u) and d((u,v)) (the delay of link (u,v)) is compared to the path delay constraint D (step 704). If the sum exceeds the path delay constraint D, no further consideration is given to the selected v and the selected v is not included in the reachability graph. (That is, based on the link of v with u, v does not qualify for inclusion in the graph. It is still possible, however, that v will qualify based on a link between v and another node in N'). If the sum does not exceed the path delay constraint D, the selected v is marked for addition to N' (step 706). If the marking of the selected v for addition to N' is occurring for the first time (determined in step 708), the alternate delay constraint, d"(v), is assigned an initial value equivalent to d(u)+d((u,v)) (step 710). The alternate delay constraint is then reevaluated (step 712), using a method disclosed hereafter in conjunction with FIG. 8. It is then ascertained whether all nodes in the neighbour set to N' have been considered (step 714). If there exists a node within $\vec{N}$(N') which has not yet been considered, the process begins again (step 702). If all nodes with a link to u have been considered, the process returns to FIG. 6 at step 606.

Figure 8:
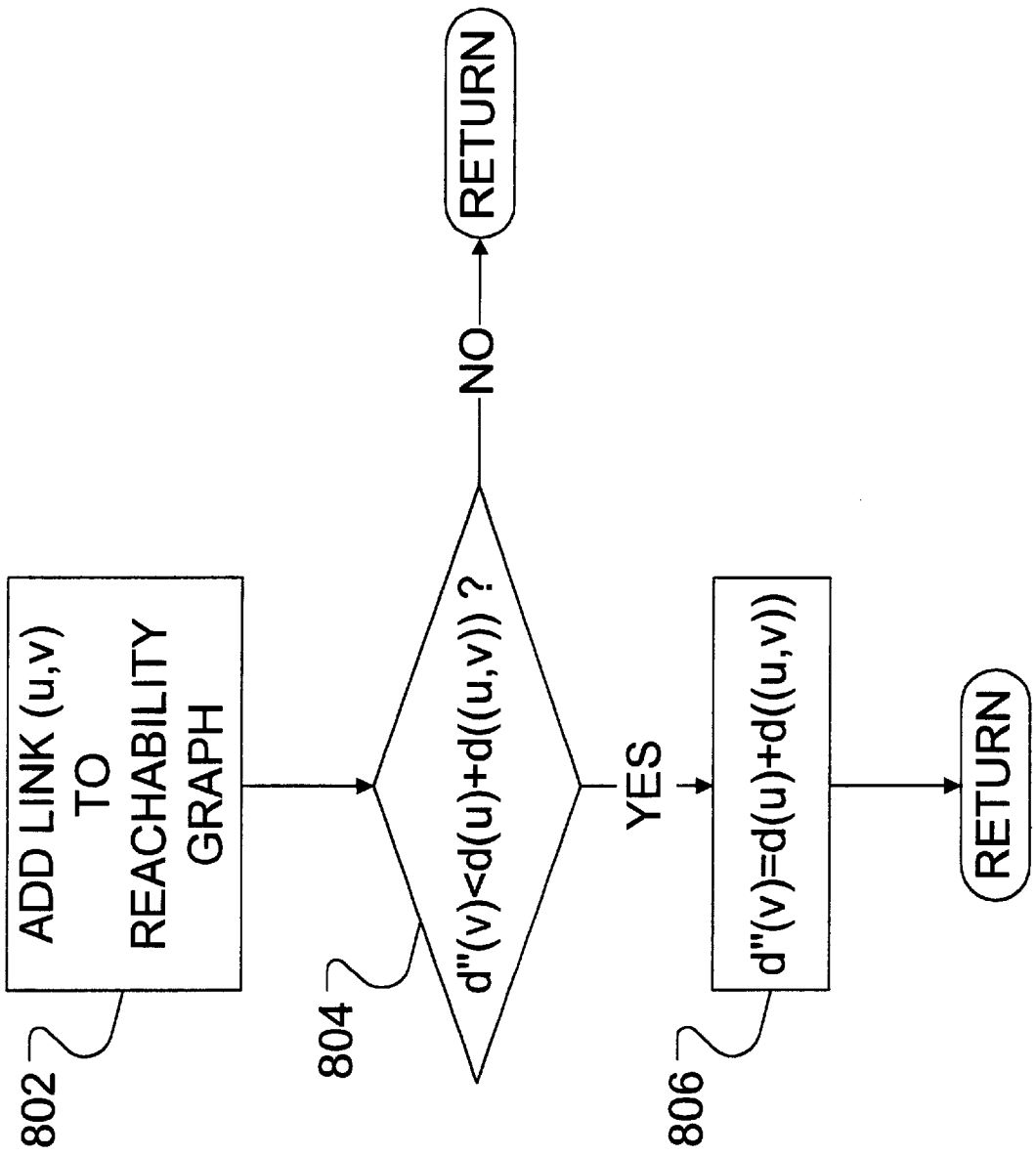
FIG. 8 illustrates, in a flow diagram, the steps of a constraint reassigning method of the process of FIG. 7.

Steps in a method for reevaluating the alternate delay constraint are illustrated in FIG. 8. Link (u,v) is added to the reachability graph (step 802). If it is determined that the sum of d(u) and d((u,v)) is greater than the current value of the alternate delay constraint d"(v) (step 804), the alternate delay constraint d"(v) is assigned the value of the sum of d(u) and d((u,v)) (step 806). If the sum is less than or equal to the alternate delay constraint, the method is complete (i.e., d"(v) remains unchanged). It will be apparent that these steps implement the max link qualification rule.

Since step 802 adds a link to v to the reachability graph whenever step 704 finds d(u)+d((u,v)) is less than D, it will be apparent that if more than one u has a link to v, more than one link to v may be included in the reachability graph.

The procedure for adding a stage to a reachability graph has the advantage that every single path in the reachability graph sourced at the source node s satisfies the path delay constraint (step 704, FIG. 7) and there are no cyclic paths in the reachability graph. Note that once a given node v is placed in the node set N', no more links leading to this given node will be added to the reachability graph in later stages.

Figure 9:
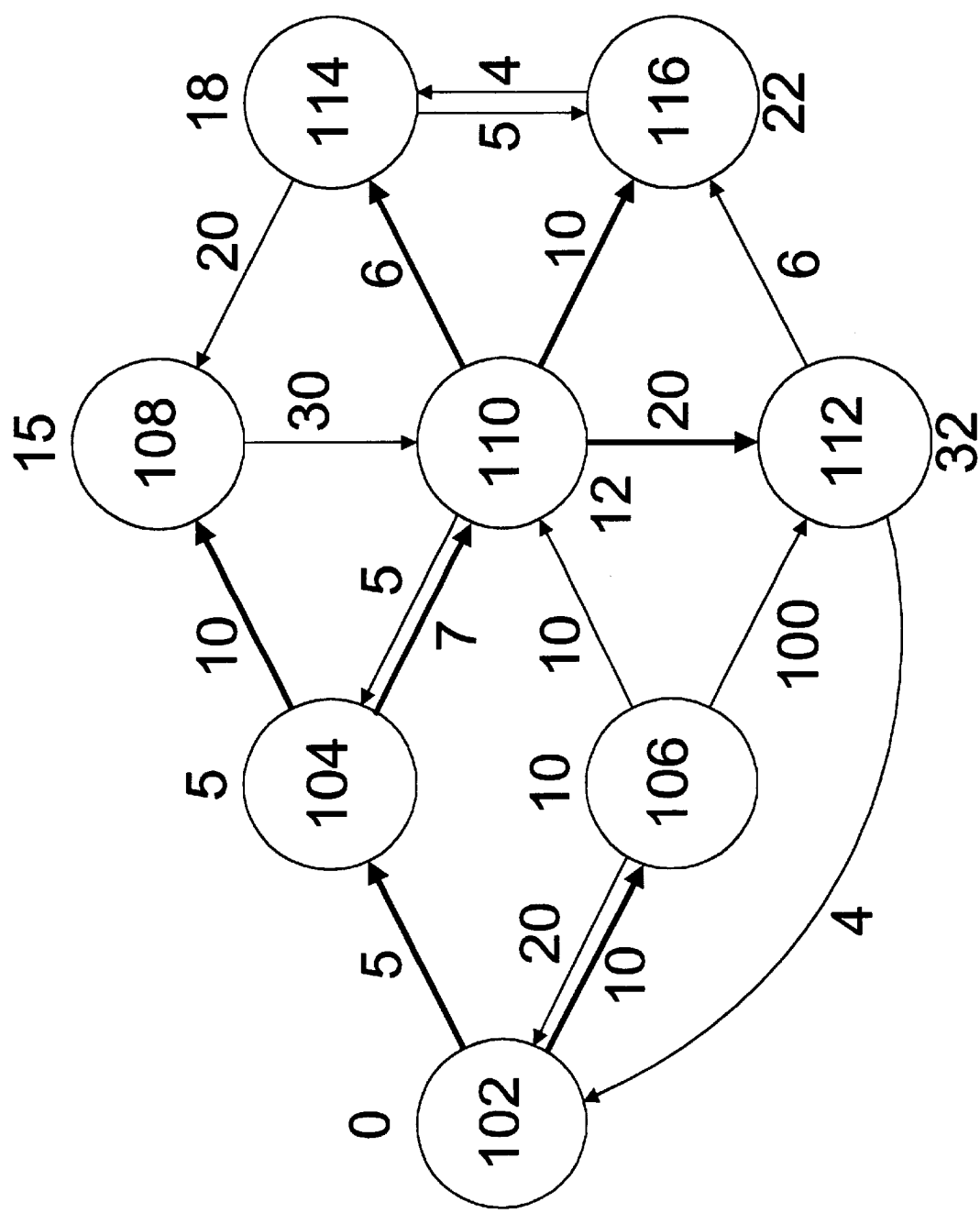
FIG. 9 illustrates, a result of a first application of the algorithm of FIG. 3 applied to the network of FIG. 1.

By way of example, consider the algorithm of FIG. 4 as it applies to network G of FIG. 1 with source node, s, being 102 and a path delay constraint D of 40 time units. FIG. 9 illustrates the result of the application of Dijkstra's Algorithm (FIG. 4) to the network G of FIG. 1 using the delay of each link as weights (step 302). The heavy lines represent links in the shortest delay path to each node. Each node is assigned a delay constraint d(v) with a value equivalent to the sum of link delays over the shortest delay path from the source node s to the particular node. For each node in network G a path does exist which satisfies the path delay constraint D, thus no nodes are disqualified (step 304). A reachability graph is constructed (step 306) for network G, where the start node, s, is node 102. Construction is accomplished in three stages.

Figure 10:
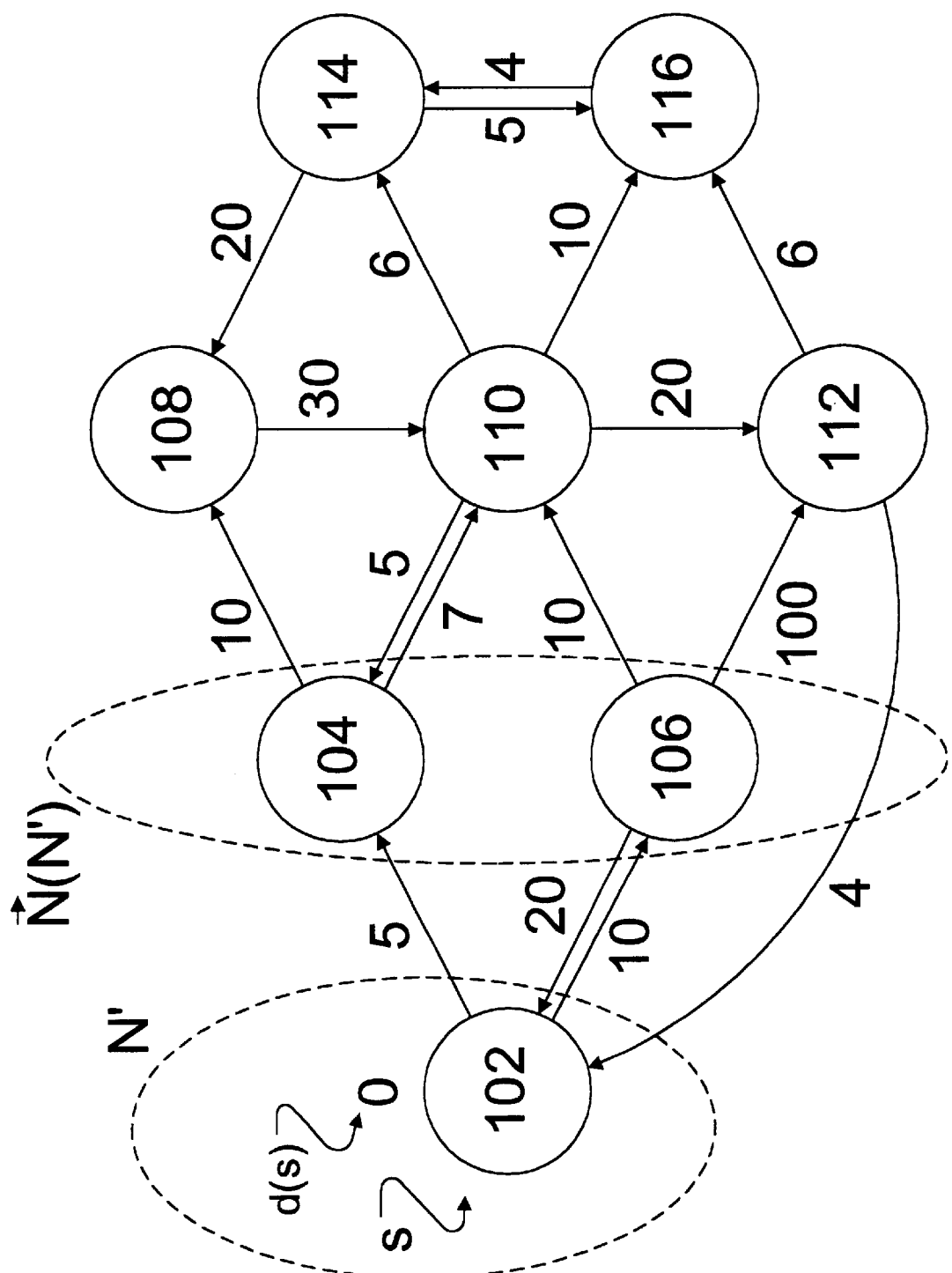
FIGS. 10 to 13 illustrate an example of the application of FIGS. 6 through 8 to the network of FIG. 1.

Stage 1—FIG. 10

N' is initialized with node s (FIG. 5, step 502). As N' comprises only node s, it is selected as node u (FIG. 6, step 602). Node 104 is selected as node v (FIG. 7, step 702). Since the sum d(s)+d((s,104)) is less than the path delay constraint D, node 104 is marked for addition to N' (FIG. 7, step 706). As it is the first time that node 104 has been marked, the alternate delay constraint d"(104) is initialized with the value of the sum d(s)+d((s,104)) (FIG. 7, step 710). Link (s,104) is added to the unfinished reachability graph N' (FIG. 8, step 802). Since the alternate delay constraint d"(104) is equivalent to the sum d(s)+d((s,104)), the alternate delay constraint is not reassigned (FIG. 8, step 804).

Figure 11:
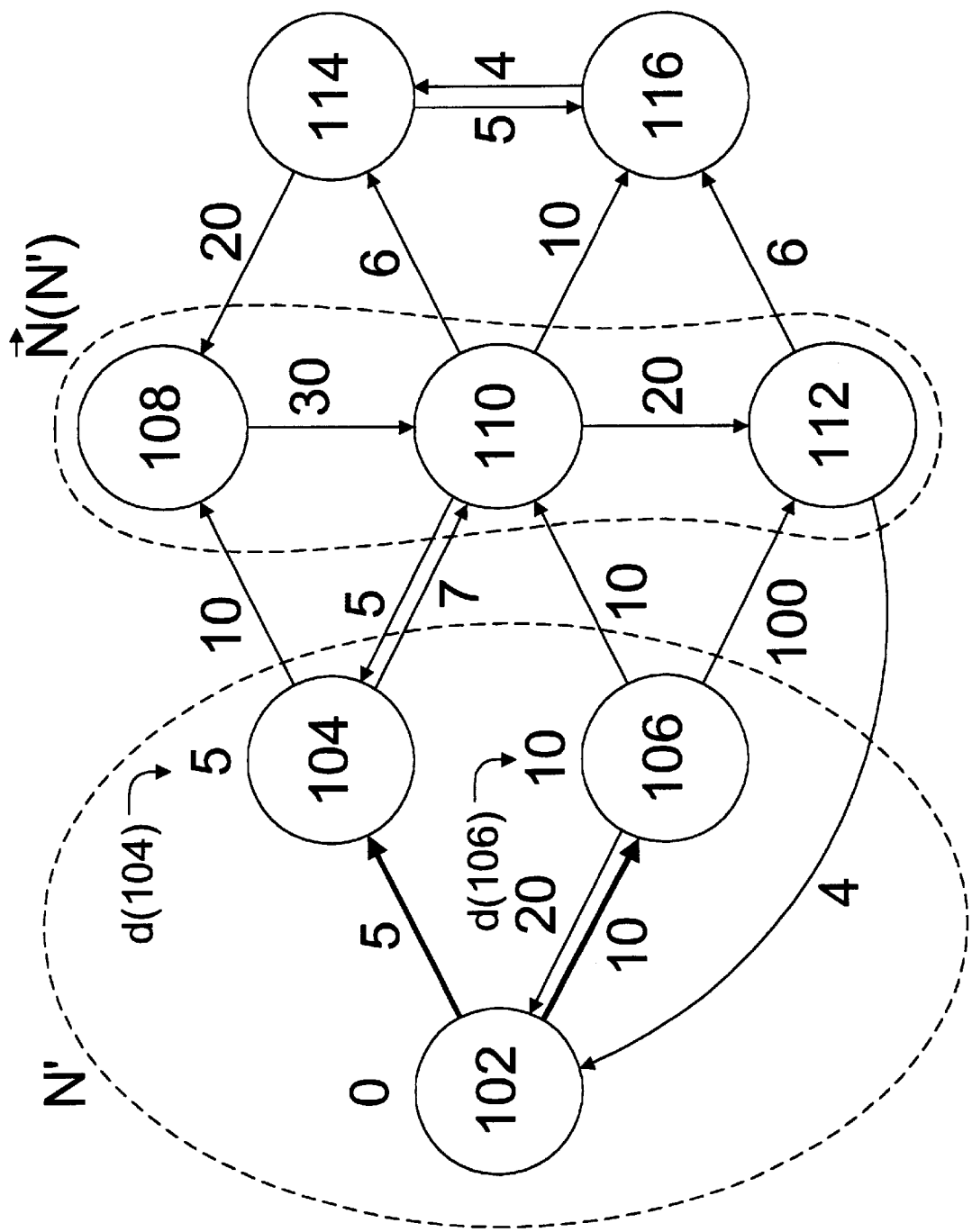

Node 106 is then selected as node v. Since the sum d(s)+d((s,106)) is less than the path delay constraint D, node 106 is marked for addition to N'. As it is the first time that node 106 has been marked, the alternate delay constraint d"(106) is initialized with the value of the sum d(s)+d((s, 106)). Link (s,106) is added to the unfinished reachability graph N' (FIG. 8, step 802). Since the alternate delay constraint d"(106) is equivalent to the sum d(s)+d((s,106)), the alternate delay constraint is not reassigned. Since all neighbour nodes v have been considered (FIG. 7, step 714), all nodes u in N' have been selected (FIG. 6, step 606) and there are nodes marked for addition to N' (FIG. 6, step 608), nodes 104 and 106 are added to N' (FIG. 6, step 610). The delay constraints d(104) and d(106) are assigned the values of d"(104) and d"(106) respectively (step 612). FIG. 11 shows the new subset N' which includes nodes 104, 106 as well as the values for d(104), d(106) and, in heavy lines, links (102, 104) and (102, 106) which are part of the reachability graph.

Stage 2—FIG. 11

Node 104 may be selected as node u and node 108 may be selected as node v. Since the sum d(104)+d((104, 108)) is less than the path delay constrainst D, node 108 is marked for addition to N'. As it is the first time that node 108 has been marked, the alternate delay constrainst d" (104, 108) is initialized with the value of the sum d(104)+d((104, 108)). Link (104, 108) is added to the unfinished reachability graph N'. Since the alternate delay constrainst d" (108) is equivalent to the sum d(104)+d((104, 108)), the alternate delay constrainst is not reassigned.

Node 110 is next selected as node v. Since the sum d(104)+d((104,110)) is less than the path delay constraint D, node 110 is marked for addition to N'. As it is the first time that node 110 has been marked, the alternate delay constraint d"(110) is initialized with the value of the sum d(104)+d ((104,110)). Link (104,110) is added to the unfinished reachability graph N'. Since the alternate delay constraint d"(110) is equivalent to the sum d(104)+d((104,110)), the alternate delay constraint is not reassigned.

Since all nodes v with a link to node 104 have been considered, node 106 is next selected as node u. Node 110 may be selected as node v. Since the sum d(106)+d((106, 110)) is less than the path delay constraint D, node 110 is marked for addition to N' and link (106,110) is added to the unfinished reachability graph N'. As it is not the first time that node 110 has been marked, the reevaluation of the alternate delay constraints is the next step. Since the alternate delay constraint d"(110) is greater than the sum d(106)+d((106,110)), the alternate delay constraint is reassigned to the latter value.

Node 112 is then selected as node v. Since the sum d(106)+d((106,112)) is greater than the path delay constraint D, node 112 is not marked for addition to N'.

At this point, all nodes v with a link to node 106 have been considered. Also, all nodes u in N' with a link to a neighbour node have been selected. There are nodes marked for addition to N', nodes 108 and 110, which are now added to N' and the delay constraints d(108) and d(110) are assigned the values of d"(108) and d"(110), respectively. Earlier in stage 2, links (104,108) and (104,110) were added to the unfinished reachability graph N'.

Figure 12:
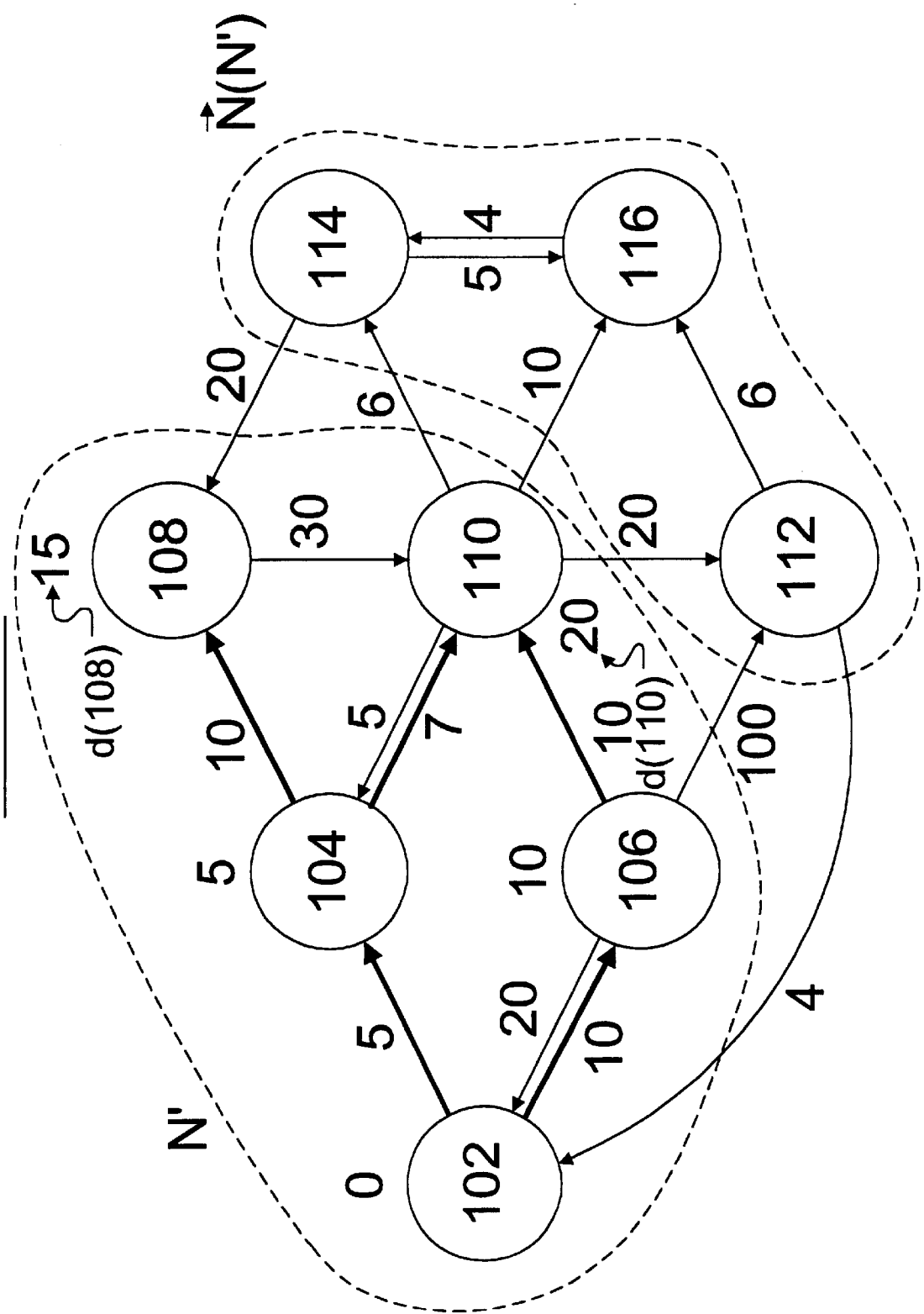

Stage 3—FIG. 12

Note that node 110 and node 106 are the only nodes which have outgoing links to $\vec{N}(N')$. Also note that the link (106, 112) was considered and invalidated in the last stage and does not need re-evaluation.

Node 110 may then be selected as node u and node 112 (which was not added to the reachability graph in stage 2) may be selected as node v. Since the sum d(110)+d((110, 112)) is less than the path delay constraint D, node 112 is marked for addition to N'. As it is the first time that node 112 has been marked, the alternate delay constraint d"(112) is initialized with the value of the sum d(110)+d((110,112)). Link (110,112) is added to the unfinished reachability graph N'. Since the alternate delay constraint d"(112) is equivalent to the sum d(110)+d((110,112)), the alternate delay constraint is not reassigned. Node 114 may then be selected as node v. Since the sum d(110)+d((110,114)) is less than the path delay constraint D, node 114 is marked for addition to N'. As it is the first time that node 114 has been marked, the alternate delay constraint d"(114) is initialized with the value of the sum d(110)+d((110,114)). Link (110,114) is added to the unfinished reachability graph N'. Since the alternate delay constraint d"(114) is equivalent to the sum d(110)+d ((110,114)), the alternate delay constraint is not reassigned. Node 116 is next selected as node v.

Since the sum d(110)+d((110,116)) is less than the path delay constraint D, node 116 is marked for addition to N'. As it is the first time that node 116 has been marked, the alternate delay constraint d"(116) is initialized with the value of the sum d(110)+d((110,116)). Link (110,116) is added to the unfinished reachability graph N'. Since the alternate delay constraint d"(116) is equivalent to the sum d(110)+d ((110,116)), the alternate delay constraint is not reassigned.

Figure 13:
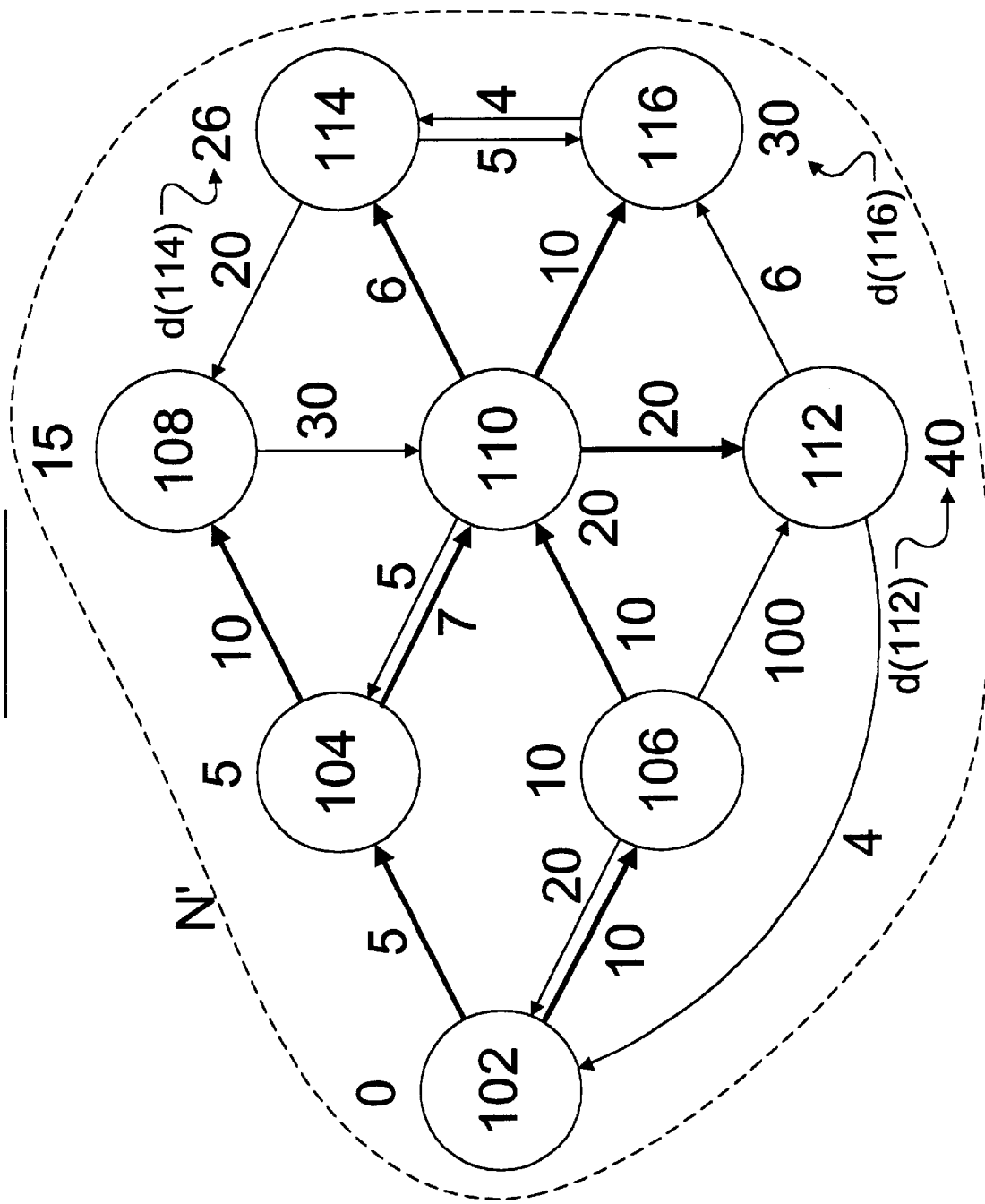

Since all nodes v have been considered for node 110, all nodes u have been selected and there are nodes marked for addition to N', nodes 112, 114 and 116 are added to N'. Further, constraints d(112), d(114) and d(116) are assigned the values of d"(112), d"(114) and d"(116), respectively (FIG. 13). Since all nodes have been evaluated for inclusion in the reachability graph, it is complete (FIG. 5, step 506).

Figure 14:
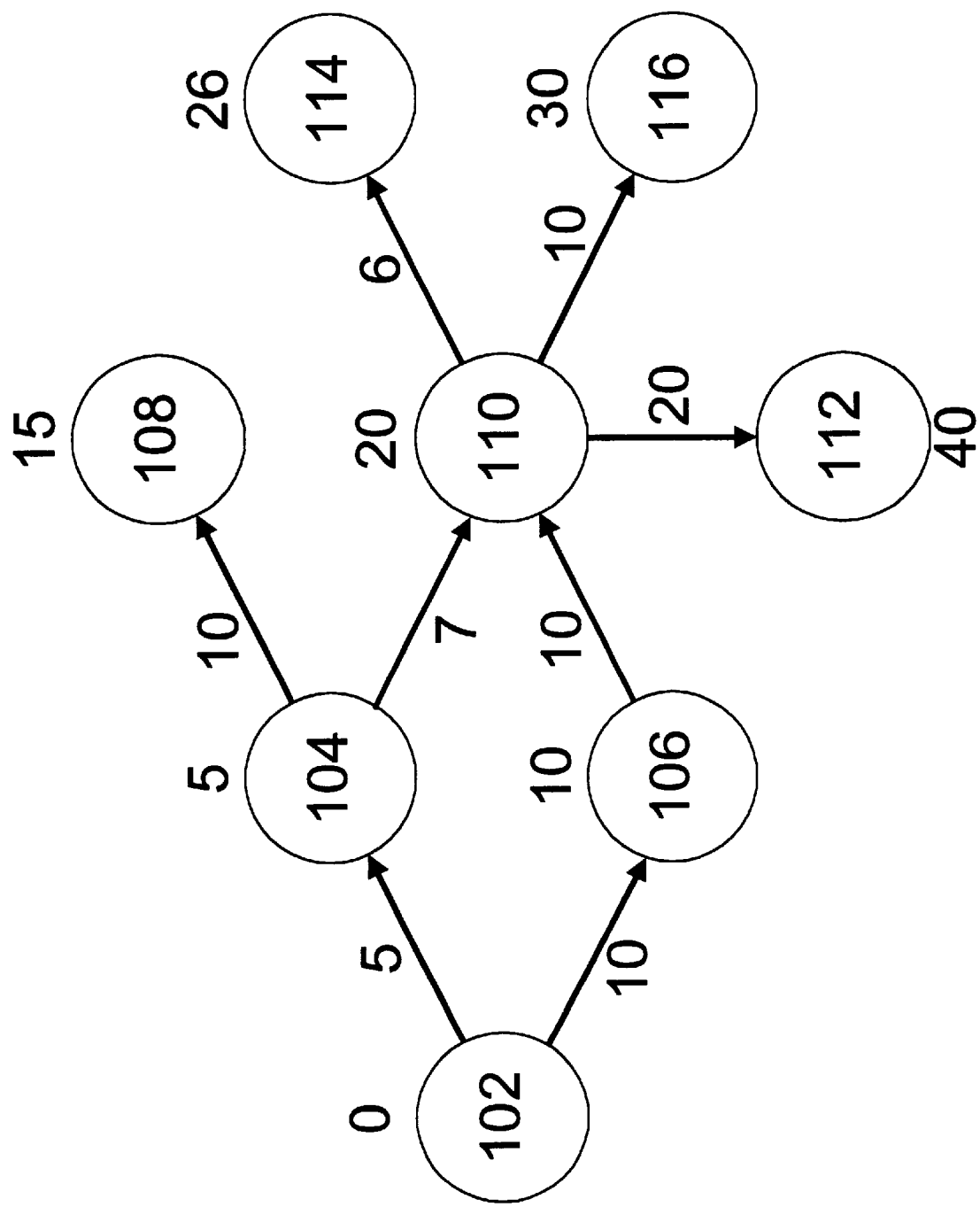
FIG. 14 illustrates an example of the result of the application of FIGS. 6 through 8 to the network of FIG. 1.

There is now a complete reachability graph from start node s (node 102) to every node in the graph that does not exceed the path delay constraint (FIG. 14).

Figure 15:
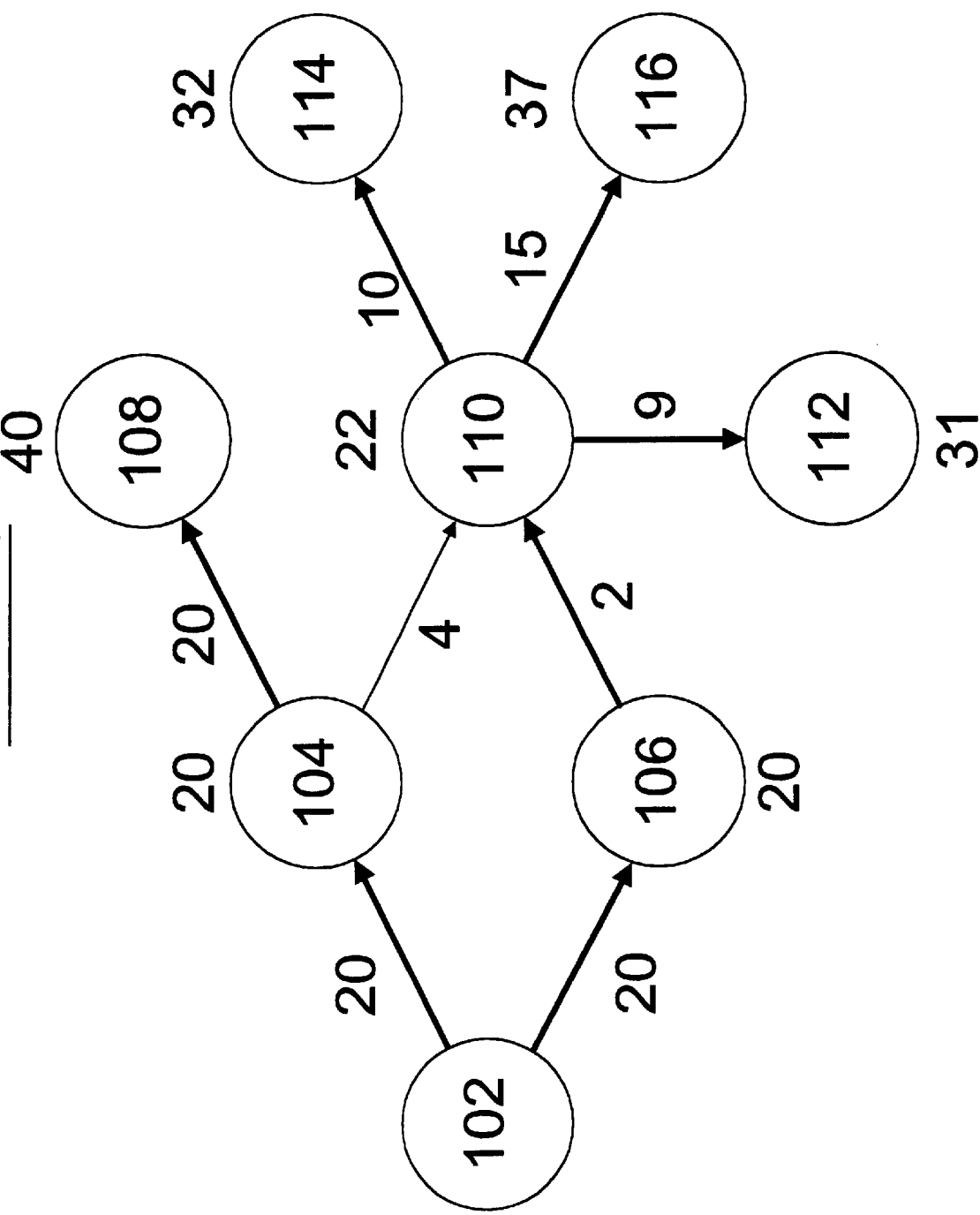
FIG. 15 illustrates an example of the algorithm of FIG. 3 applied to the network of FIG. 14.

FIG. 15 illustrates the result of the application of Dijkstra's Algorithm (FIG. 3) to the reachability graph of FIG. 14 using the cost of each link as weights (FIG. 4, step 406). Each node is assigned a cost constraint with a value equivalent to the sum of link costs over a minimum cost path from the source node s to the particular node. For each node, the minimum cost path from s to the particular node, the heavy line links in the graph of FIG. 15, is selected (FIG. 3, step 310). This minimum cost path may differ from the minimum delay path of FIG. 9. Where a call is destined from the source node to a given other node on the graph, it is routed along the selected path.

In the foregoing, the max link qualification rule was used in constructing the reachability graph. More specifically, the step of adding a stage to the reachability graph (step 506, detailed in FIGS. 6, 7 and 8) relies on the conditions of the "max link qualification rule". A drawback with the foregoing is that application of the max link qualification rule may exclude some nodes from the reachability graph which may be reached without exceeding the path delay constraint D. In such instance, the path to such nodes will not be replaced from that established by application of Dijkstra's algorithm in step 302. Consequently, a cost optimization will not be performed for such nodes.

To increase the number of nodes in respect of which a cost optimization is performed, a modified algorithm may be employed which makes use of a "min link qualification rule". The "min link qualification rule" is as follows: For a given node $V_G$ in $\vec{N}(N')$ and $U_G$ in N', link ($U_G$, $V_G$) is selected for inclusion in the reachability graph if and only if $d(U_G)+d((U_G, V_G)) \leq D$ and $d(U_G)+d((U_G, V_G))$ has a value which is the minimum value as compared with the d(u)+d ((u,$V_G$)) for all other nodes u in N' with a link to $V_G$ which satisfy the condition d(u)+d((u, $V_G$))<D. (In contrast to the situation where the max link qualification rule is employed, this usually—but not necessarily—results in only one link to any given v being included in the reachability graph. This increases the possibility that paths can further extend from $V_G$ so that more paths are eligible for cost optimization.) The delay constraint d($V_G$) at node $V_G$ is set to the minimum of d(u)+d ((u, $V_G$)). Use of the "min link qualification rule" allows for only the link with lower delay to be selected when a link from two different u's in N' to a given v have identical cost.

Figure 16:
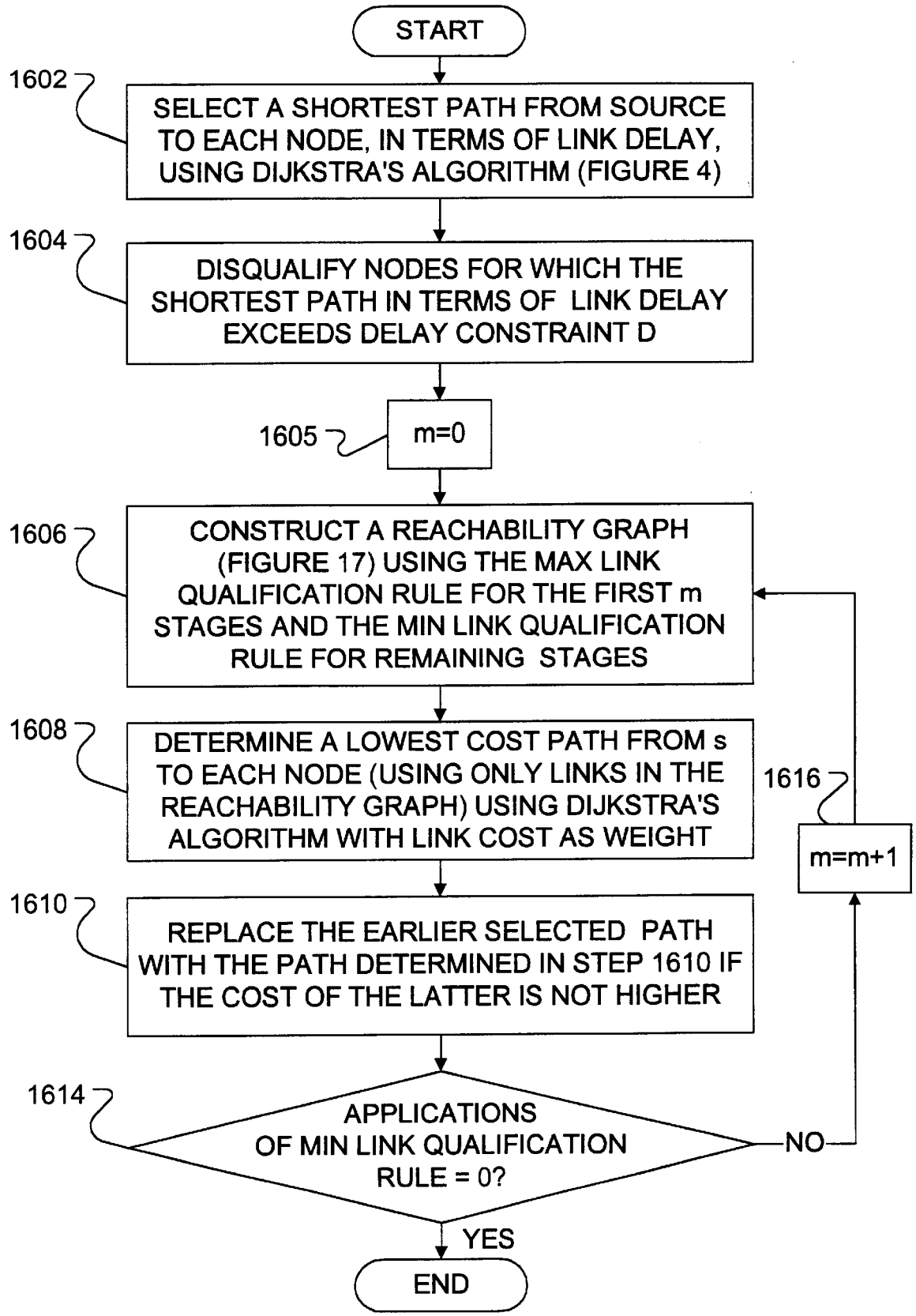
FIG. 16 illustrates, in a flow diagram, an adaptation of FIG. 3 to perform an alternative embodiment of the invention.

FIG. 16 outlines an iterative process that replaces the process of FIG. 3 for the alternative embodiment. A shortest path from a source s to each node in terms of delay is first selected using Dijkstra's Algorithm (step 1602). Those nodes for which the delay of the associated shortest delay path exceeds the path delay constraint D are disqualified from further consideration (step 1604). A counter, m, of the number of applications of the max link qualification rule, is initialized at zero (step 1605). In the first iteration, a reachability graph is constructed from source node s, using the min link qualification rule at every stage (step 1606). The path to each node with minimum cost is determined using Dijkstra's Algorithm, using only links in the reachability graph (step 1608). In subsequent iterations, a previously selected path to a particular node is replaced by the path determined in step 1608 if the cost of the latter path is no more than the cost of the former path (step 1610). Note that the old path is replaced by the new path even when the costs are identical. This results in improved load balancing. One application of the above process (constructing a reachability graph, determining the minimum cost paths within the reachability graph and replacing previously selected paths) may be called an iteration. The process is repeated and, for each iteration, the number of stages of the reachability graph construction using the max link qualification rule is increased by one (step 1616). The process is complete when the most recent iteration has used only the max link qualification rule (step 1614).

Only the min link qualification rule is used in the first iteration. In the second iteration, the max link qualification rule is used in the first stage and the min link qualification rule in the rest of the stages of construction. In general, the max link qualification rule is used in the first 0, 1, 2, . . . , stages and the min link qualification rule in the rest of the stages. In particular, the first iteration uses the min link qualification rule only and the last iteration uses the max link qualification rule only.

Figure 17:
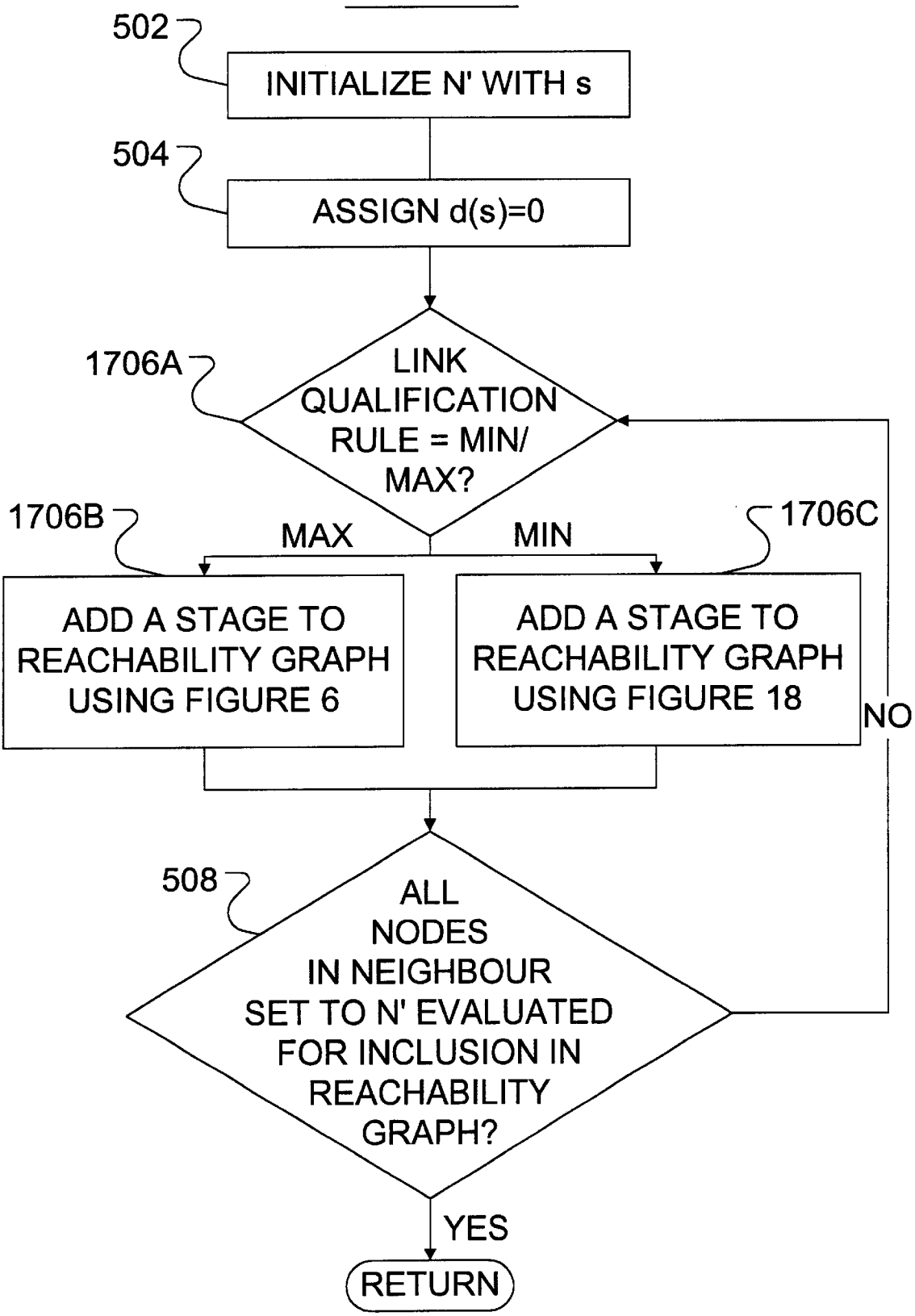
FIG. 17 illustrates, in a flow diagram, the steps of a reachability graph constructing algorithm of the process of FIG. 16.

To implement this procedure, the reachability graph constructed in step 1606 is constructed according to the procedure set out in FIG. 17. Turning to FIG. 17, it will be apparent that, except for steps 1706, the procedure is identical to that of FIG. 5 in the first embodiment, and like steps have been given like reference numerals. Step 1706 calls the procedure of FIG. 6 when the next stage is be added to the reachability graph using the max link qualification rule (step 1706B) and FIG. 18 when the next stage is to be added using the min link qualification rule (step 1706C).

Figure 18:
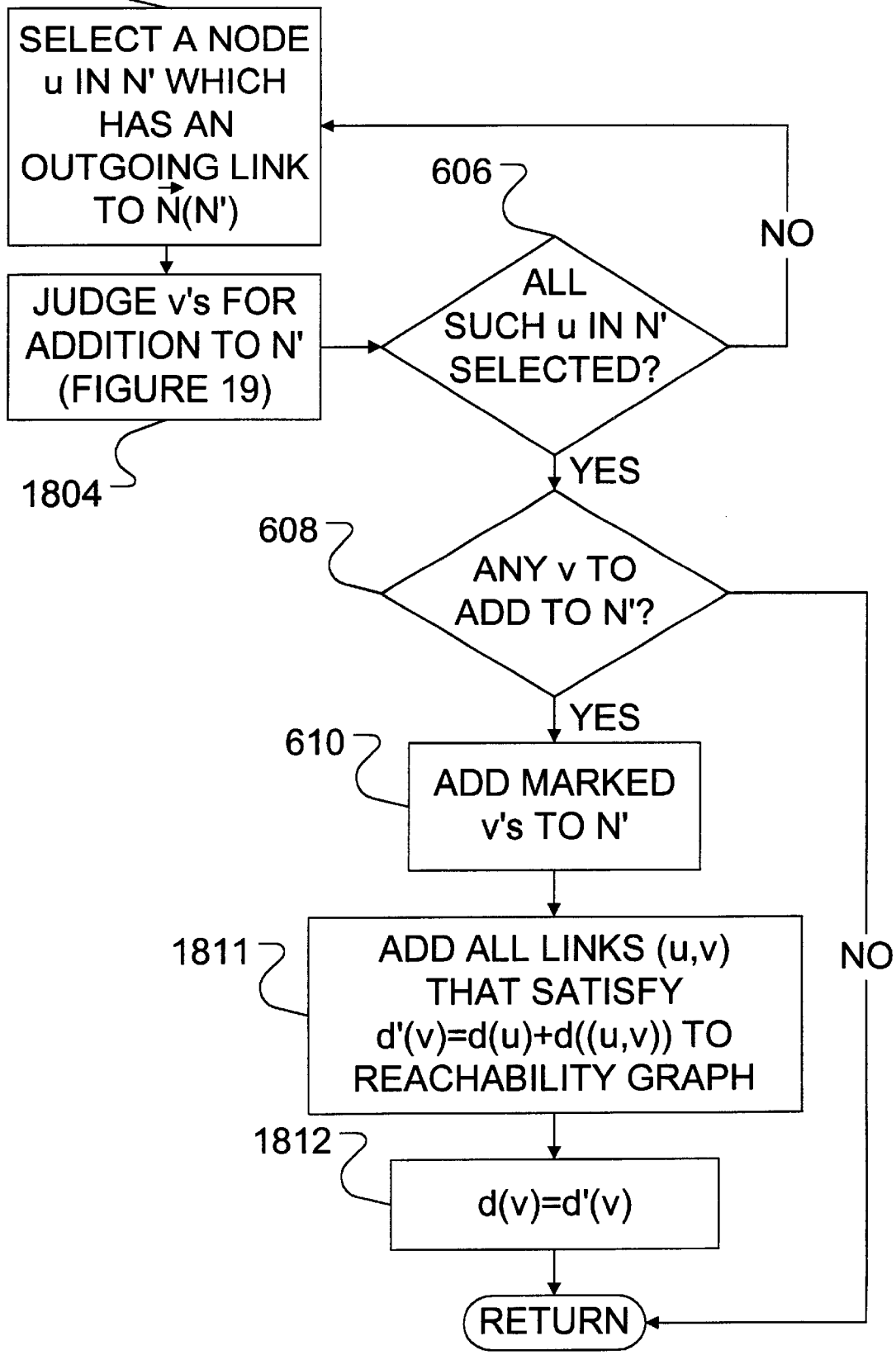
FIG. 18 illustrates, in a flow diagram, the steps of a reachability graph stage adding procedure of the algorithm of FIG. 17.
Figure 19:
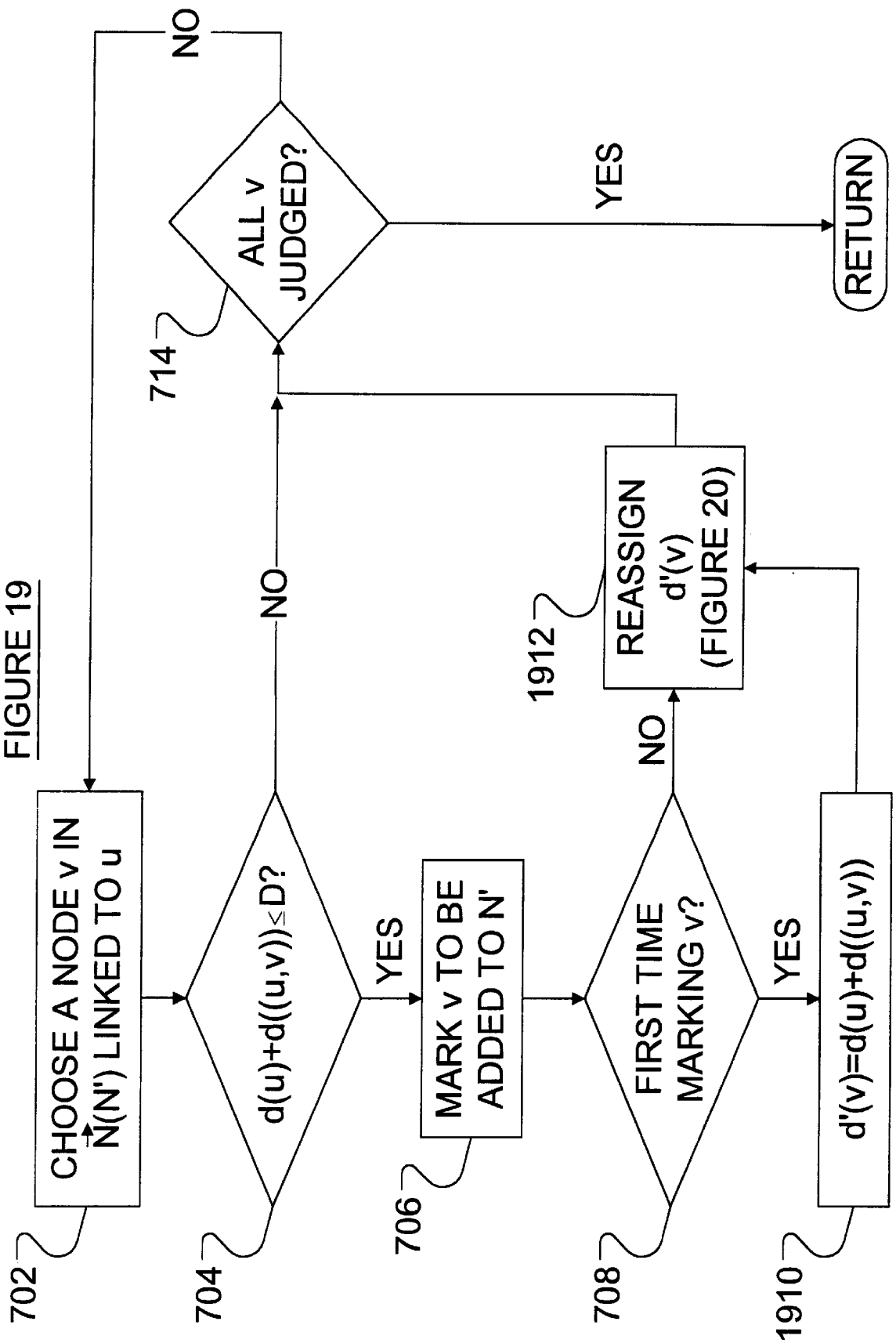
FIG. 19 illustrates, in a flow diagram, the steps of a node judging process of the procedure of FIG. 18.
Figure 20:
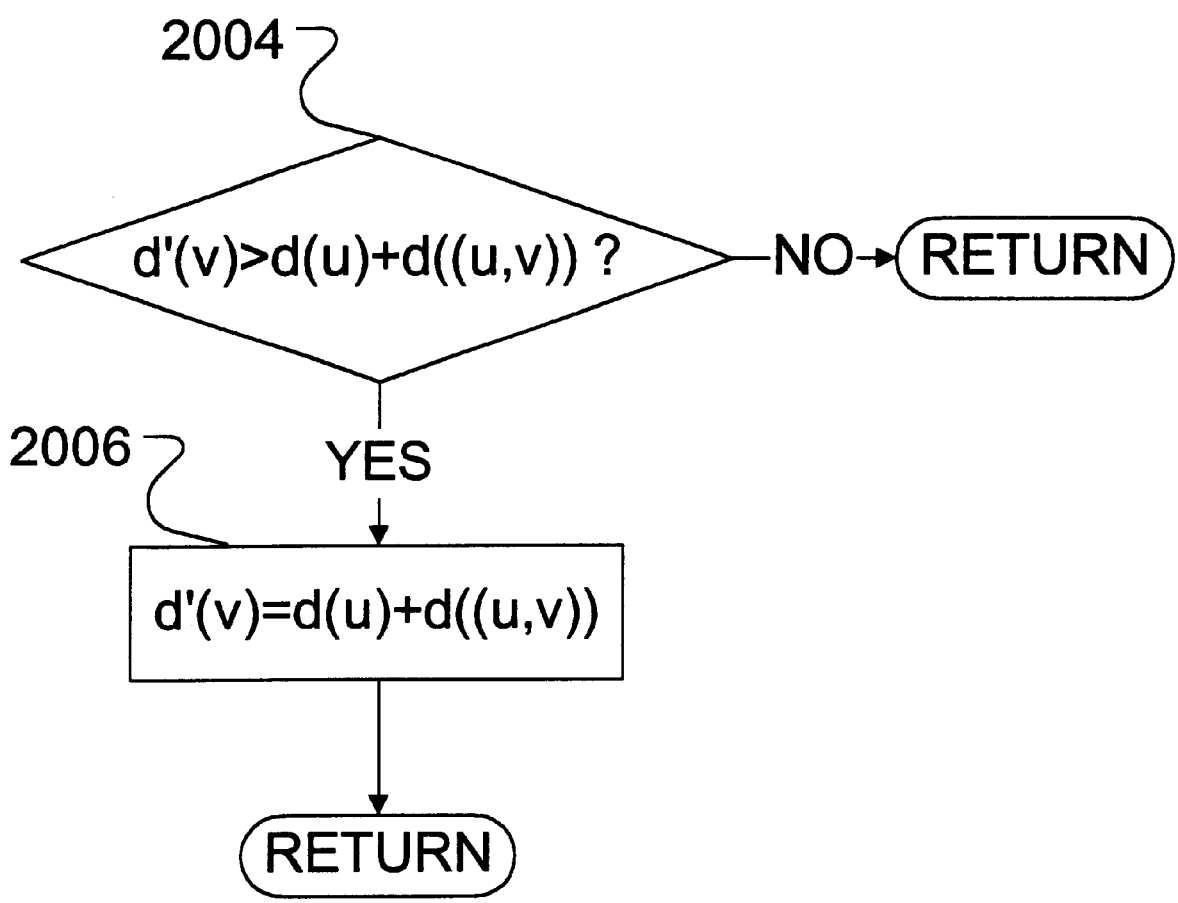
FIG. 20 illustrates, in a flow diagram, the steps of a constraint reassigning method of the process of FIG. 19.

Turning to FIG. 18, the procedure to add a stage to the reachability graph under the min link qualification rule is similar to that of the procedure of FIG. 6 used in conjunction with the max link qualification rule and like steps have been given like reference numerals. However, where step 604 of FIG. 6 calls the procedure of FIG. 7 to judge v's for addition to N', step 1804 of FIG. 18 calls the procedure of FIG. 19. Turning to FIG. 19, the procedure is identical to that of FIG. 7, and like steps are given like reference numerals, except that step 1910 initialises d'(v)—in contrast to step 710 of FIG. 7 which initialises d"(v). Also, step 1912 reassigns d'(v)—in contrast to step 712 of FIG. 7 which reassigns d"(v). This reassignment is accomplished with the steps of FIG. 20. Turning to FIG. 20, if it is determined in step 2004 that the sum of d(u) and d((u,v)) is less than the current value of the alternate delay constraint d'(v), the alternate delay constraint d'(v) is assigned the value of the sum of d(u) and d((u,v)) (step 2006). If the sum is greater than the alternate delay constraint, the method is complete (i.e., d'(v) remains unchanged). It will be apparent that these steps implement the min link qualification rule.

Returning to FIG. 18, when adding a stage in accordance with the min link qualification rule, steps 1811 and 1812 illustrated in FIG. 18 replace step 612 of FIG. 6. In consequence, after all marked v's are added to N' (step 610), all links that satisfy d'(v)=d(u)+d((u,v)) are added to the reachability graph (step 1811). Then d(v) for each added v is set equal to d'(v) (step 1812).

In consequence, a link from a given node u to a particular node v will only be added to the reachability graph if its delay, when added to the delay associated with given node u, is at least as small as the delay associated with each other link to particular node v summed with the delay associated with the node u from which each other link is sourced. In the typical case, one of these sums is smaller than all others and so typically only one link to particular node v is added to the reachability graph. It is, however, possible that more than one link to node v is added to the reachability graph. The delay constraints, d(v), associated with nodes v marked for addition to N' in step 604, are assigned the value of a corresponding alternate delay constraint, which is d'(v) for the min link qualification rule.

While a particular node, x, may be reachable using the min link qualification rule, it may not be reachable using the max link qualification rule. The min link qualification rule therefore tends to allow reachability graph construction to extend further forward and possibly cover more nodes. This is because node x is usually assigned a smaller delay value d(x) with the min link qualification rule than with the max qualification rule. As a result, it is possible that some nodes may be reachable with respect to the delay constraint when the min link qualification rule is applied but not reachable when the max qualification rule is used at node x.

In general, once a reachability graph has been constructed, a greater number of links normally exist between the source node s and an arbitrary node y if the max link qualification rule was applied in constructing the graph than if the min link qualification rule was applied. Conversely, a greater likelihood exists that a path from source node s through arbitrary node y to a further node x will exist if the min link qualification rule was applied in constructing the graph than than if the max link qualification rule was applied.

Note also that load balancing (i.e., use of different links in paths to different nodes) is promoted by this algorithm. Paths selected by one application of Dijkstra's Algorithm in step 1608 tend to have heavy link sharing, especially towards the source node. The progressive increasing use of the max link qualification rule in many iterations of reachability graph construction allows alternative links to be used not only for the purpose of cost Optimization but also for the purpose of load balancing.

To simplify the route selection algorithm, the first two steps, namely selecting a shortest path from a source s to each node in terms of delay and disqualifying those nodes for which the delay of the associated shortest delay path exceeds the path delay constraint D, may be eliminated. In this simplified embodiment, a reachability graph is constructed which includes links, and nodes terminating the links, whose sum of delays along every path in the reachability graph starting at the source node s and passing through the link is no greater than the path delay constraint D. Then, using only the links in the reachability graph, a minimum cost route is selected to each node in the reachability graph.

The max link qualification rule may be used in the reachability graph construction step of the above simplified algorithm. However, a reachability graph so constructed might not include all nodes to which paths exist whose path delay satisfies the path delay constraint D.

Another simplified embodiment may employ only two iterations, one using the max link qualification rule throughout while the other uses the min link qualification rule throughout.

Since concave metrics can be handled simply by ignoring those links where the path constraints are not satisfied, discussion of concave metrics has been omitted in the preceding to simplify the description. Any actual implementation of the algorithm may take into consideration any concave metrics.

Other modifications will be apparent to those skilled in the art and, therefore, the invention is defined in the claims.

We claim:

1. In a communication network comprising nodes interconnected by links to form paths, wherein each of the links is associated with a primary and secondary quality of service (QoS) metric, each of the primary and secondary QoS metrics being additive, a method for selecting an optimal path between a source and a destination node comprising:

(a) selecting a first path between a specified source and a specified destination node from a plurality of possible paths, wherein for each of the plurality of possible paths the sum of the primary QoS metric associated with each of its corresponding links is calculated, and wherein the selected first path corresponds to the shortest calculated path;

(b) eliminating a selected destination node associated with a selected one of the plurality of possible paths for which the primary QoS metric constraint is not met, the primary QoS metric constraint being compared to the shortest calculated path of each of the plurality of possible paths;

(c) constructing a reachability graph comprising one or more of the plurality of possible paths, wherein a selected one of the plurality of possible paths is included in the reachability graph if the calculated primary QoS metric sum is less than a primary QoS metric constraint;

(d) selecting a second path between the specified source and the specified destination node from the included paths in the reachability graph, wherein for each of the included paths the sum of the secondary QOS metric associated with each of its corresponding links is calculated, and wherein the selected second path corresponds to the lowest calculated secondary QoS metric sum; and (e) replacing the first path with the second path if the second path is different than the first path;

wherein step (c) further comprises using an iterative process to calculate the primary QoS metric sum beginning at the source node and continuing with a respective neighbour set of nodes until all of the nodes have been evaluated;

and wherein each iteration comprises: (a) selecting each destination node which is directly connected to the source node by one of the links, wherein a respective destination node is deemed reachable and selected if $d(u)+d(u,v)<\leq D$ where $d(u)$ is the primary QoS metric for the source node, $d(u,v)$ is the primary QoS metric for the respective link, and $D$ is the primary QoS metric constraint; and (b) setting the respective selected destination node to $d(u)+d(u,v)$.

2. The method of claim 1 wherein the primary QoS metric is delay and wherein each of the links is weighted with respect to the delay and wherein the primary QoS metric constraint is a maximum allowable delay.

3. The method of claim 2 wherein step (a) is performed using Dijkstra's algorithm.

4. The method of claim 1 wherein the secondary QoS metric is cost and wherein each of the links is weighted with respect to the cost.

5. The method of claim 4 wherein step (d) is performed using Dijkstra's algorithm.

6. The method of claim 1 wherein if there is more than one source node linked to a respective destination node, the value assigned to the destination node, is the maximum of $d(u)+d(u,v)$, providing $d(u)+d(u,v)$ does not exceed $D$.

7. The method of claim 1 wherein if there is more than one node linked to a respective destination node, a selected one of the interconnecting links will be chosen if the selected link is the minimum of $d(u)+d(u,v)$, providing $d(u)+d(u,v)$ does not exceed $D$.

8. The method of claim 1 wherein a max link qualification rule and a min link qualification rule are used in a preselected sequence in constructing the reachability chart, the max link qualification rule and min link qualification rule being used when there is more than one of the nodes linked to a respective destination node.

* * * * *